United States Patent [19]

Hwang et al.

[11] Patent Number: 5,396,165
[45] Date of Patent: Mar. 7, 1995

[54] EFFICIENT POWER TRANSFER SYSTEM

[75] Inventors: Jeffrey H. Hwang, Saratoga; Peter Reischl, Los Gatos; Wen H. Yu, San Francisco; Kartik Bhatt, Newark; Gary J. Lin, Campbell; George C. Chen, Milpitas, all of Calif.

[73] Assignee: Teledyne Industries, Inc., Mountain View, Calif.

[21] Appl. No.: 13,809

[22] Filed: Feb. 2, 1993

[51] Int. Cl.[6] ............................................. G05F 1/70
[52] U.S. Cl. .................................... 323/210; 323/222; 323/282; 323/299; 363/44; 363/89
[58] Field of Search ............... 323/205, 207, 210, 222, 323/266, 267, 282, 299; 363/39, 44, 62, 84, 89, 125, 126

[56] References Cited

U.S. PATENT DOCUMENTS

| | | | |
|---|---|---|---|
| 4,654,769 | 3/1987 | Middlebrook | 363/62 |
| 4,761,725 | 8/1988 | Henze | 323/222 |
| 4,811,185 | 3/1989 | Cook et al. | 363/62 |
| 5,013,992 | 5/1991 | Eavenson et al. | 320/31 |
| 5,115,185 | 5/1992 | Fraidlin et al. | 323/207 |

Primary Examiner—Jeffrey L. Sterrett
Attorney, Agent, or Firm—Skjerven, Morrill, MacPherson, Franklin & Friel

[57] ABSTRACT

A power transfer method and apparatus for efficient transfer of power are disclosed. Input power is converted in an essentially lossless manner to an intermediate form having a voltage or current in excess of that desired at the load. The intermediate power form is split into first and second parts, where the first part of the intermediate power form approximately matches an output power form desired at an output of the power transfer apparatus and the second part represents an excess power form. The first part of the intermediate power form is transferred to the output of the power transfer apparatus and the excess part is stored. Part or all of the stored excess energy is recycled in an essentially lossless manner, converted into a form that approximately matches the output power form desired at the output of the power transfer apparatus and transferred to the output of the power transfer apparatus.

41 Claims, 15 Drawing Sheets

EFFICIENT POWER TRANSFER SYSTEM

BACKGROUND

1. Field of the Invention

The invention relates generally to a system for transferring electrical power from a source to a load. The invention relates more specifically to circuits and methods for efficiently converting the voltage and/or current parameters of electrical power from one form to another and for optionally correcting power factor error.

2. Description of the Related Art

Electrical power is often generated in one form and converted to another before being applied to an electrical load.

Form conversion can occur numerous times in the interim between when electrical energy is first produced by an electric generator and when it is finally delivered to a load and utilized for useful work. Nonefficient conversion wastes energy. A series chain of nonefficient power conversion steps multiplies the loss of any one conversion step within the chain. As such, it is desirable to maintain high conversion efficiency in each step of form conversion, particularly when a series chain of conversions takes place.

An excellent example of multiple form conversion is seen in the alternating current (AC) power distribution system of modern day electric utilities. An electromagnetic generator at a generating station converts energy from a waterfall or other energy source into an alternating electric current. A first voltage level is maintained at the generating point in order to meet specific requirements of the generating equipment and/or site.

Typically, a step-up transformer is provided at the electric generating station to transform the voltage/current parameters of the generator output from a form having a relatively low voltage and relatively high current to a form having a relatively high voltage and low current. The high-voltage power is then transferred over long-distance utility lines to a local distribution station.

A step-down transformer is provided at the local station for converting the high-voltage form of energy to a low-voltage form. In the United States, homes and small businesses typically receive their electrical power in the form of 60 Hz 120 volt$_{RMS}$ AC signals. (RMS represents "root mean square" which is a common measurement factor used for sinusoidal and non-sinusoidal signals.)

The instantaneous power present at the electric generating station, or anywhere else along the energy distribution network, is defined as instantaneous voltage (measured in volts) multiplied by the instantaneous current (measured in amperes).

$$P(t) = V(t) \cdot I(t). \qquad \text{(Eq. 0.1)}$$

One hundred watts of electric power can come in many forms, including but not limited to, a DC (direct current) signal having a voltage of 10 V and a current magnitude of 10 amperes, or one volt and 100 amperes, or 100 volts and 1 ampere. One hundred watts of electric power can also come in the form of an AC (alternating current) sinusoidal signal having a frequency of 60 cycles per second (60 Hz), a voltage of 110 V$_{RMS}$ and a current value of approximately 0.91 A$_{RMS}$.

The term "power form" is repeatedly used herein to refer, in a broad sense, to the specific magnitudes of voltage V(t), and current I(t), of an electrical signal and to the way those magnitudes change over time and in relation to one another. The term "power form" applies to both AC and DC forms of electric power. In the case of AC electric power, the power factor (average power divided by V$_{RMS}$·I$_{RMS}$) and/or the phase correlation between voltage and current is included under the umbrella phrase, "power form." The symbol "Px" will be used to represent power form. The symbol "Pf" will be used to represent power factor.

In some instances, the power form (e.g., Px=120 V AC, 60 Hz single-phase) that is delivered by the utility company to a residential outlet can be applied directly to a working load. Examples of such working loads include single-phase AC electric motors which have been designed to operate efficiently under this power form, standard incandescent light bulbs and electric toasters.

In many other instances, however, the working load can not conform to the utility power form (e.g., 60 Hz 120 VAC) because the working load inherently requires a different power form. Conversion from the Px=60 Hz, 120 VAC power form to another power form has to be carried out in such cases. Examples of nonconforming working loads include but are not limited to: electronic circuits which operate at a standardized DC level (e.g., 5 V$_{DC}$ for TTL logic circuits); medical equipment which needs to be operated at low, isolated voltages for safety reasons; electro-optical devices, and electro-chemical work loads whose operating voltages or current magnitudes are dictated by physics and chemistry.

For purposes of illustration, we will assume the working load is a 12 volt lead-acid battery which is to be charged with electric energy delivered from the electric utility company to a residential outlet. This is an example of an electro-chemical work load whose operating voltage is dictated by the chemistry of the lead acid cell. Lead-acid batteries are preferably operated at or near integral multiples (e.g, 1-times, 2-times, 6-times) of the basic cell voltage: 2 volts. The utility power form (120 VAC, 60 Hz) is therefore preferably converted to another power form (e.g. 12 V DC) that is more suited for charging the lead-acid battery.

Many relatively complex designs are available in the arts of power converters and battery chargers for performing conversion from 120 VAC, 60 Hz to 12 V DC. See for example. U.S. Pat. No. 5,013,992 issued to Eavenson et al., May 7, 1991 "MICROPROCESSOR CONTROLLED BATTERY CHARGER".

Conventional converter designs suffer from a number of drawbacks including: power inefficiency, excessive cost, large weight and/or size and non-compatibility with sources and loads having/requiring power forms other than the ones which the converter was specifically designed for.

For purposes of further explanation we will assume a simple AC-to-DC, 120 V-to-12 V converter consisting of a step-down transformer connected to an AC outlet, a half-wave rectifier connected to the low voltage side of the transformer, a filter capacitor coupled across the output of the half-wave rectifier and a voltage-dropping resistor interposed between the filter capacitor and the working load (the 12 V chargeable battery).

Assume in this example that the step-down transformer converts the 120 VAC, 60 Hz utility voltage into a 60 Hz sinusoidal signal having a peak-to-peak magnitude of 40 volts. The half-wave rectifier charges the filter capacitor to a peak 20 volt DC level once every cycle; provided that the voltage of the capacitor drops below the 20 V peak level during the positive half of each such cycle. DC current flows from the filter capacitor through the voltage-dropping resistor into the 12 V battery. The voltage-dropping resistor absorbs the voltage difference between the 20 V peak across the capacitor and the 12 volts or less found across the battery under charge.

There are many inefficiencies in such a system. One major inefficiency comes from the fact that excess voltage is wasted away in the form of heat generated by the action of the voltage-dropping resistor.

Another inefficiency comes about because current does not flow through the half-wave rectifier when the 60 Hz waveform is in the negative half of its cycle. Even when the 60 Hz waveform enters the positive half of its cycle, current does not begin to flow through the half-wave rectifier until the rectifier input voltage exceeds the voltage then present across the filter capacitor. A large current spike develops at that time. Then, once the peak of the positive phase is reached, and the filter capacitor charges to peak, current flow abruptly stops because the rectifier becomes reverse biased. So current again ceases to flow.

This is not an efficient way to transfer power from the utility generator to the working load. Because instantaneous power is defined as $P(t) = V(t) \cdot I(t)$, no instantaneous power flows through the rectifier during the entire negative half of each 60 Hz cycle, no power flows through the rectifier while the 60 Hz input voltage begins its climb from zero to the capacitor level during the start of the positive half cycle, and no power flows through while the 60 Hz input voltage drops from peak to zero during the end of the positive half cycle. As a result, power transfer is concentrated into a short time period in which a large burst of energy has to pass through the rectifier. This disadvantageously strains the rectifier.

Also, the power factor seen looking from the utility side into the half-wave rectifier is much less than 100%. This is undesirable. An "ideal," purely-resistive load would exhibit a 100% power factor. Capacitive or inductive loads have lower power factors and the phase relation between voltage and current is lagging or leading depending on whether the load is capacitive or inductive. The low power factor creates a disadvantageous energy loss along the utility lines.

In addition to these drawbacks, the hypothetical half-wave rectified converter that is being considered here has limited utility. It can not be used to charge a 24 volt lead-acid battery because the output of its step-down transformer is fixed to 20 volts peak. (The utility voltage is assumed to be fixed to 120 VAC here.)

If the load is changed to a 6 volt battery instead of a 12 V battery, the efficiency of our hypothetical converter would drop off significantly. Thus it would not be advisable to use the converter with load that requires a power form very different from that which the converter was designed to service.

Problems would also be encountered if the input voltage, and/or frequency, and/or waveform were to be changed. A converter that is designed to operate from a 120 VAC 60 Hz US residential source, for example, would not necessarily operate properly if driven by a 400 Hz airborne source or a 220 V 50 Hz European source.

Those skilled in the art will recognize that many techniques have been developed in an attempt to overcome some of the above-mentioned drawbacks. Unfortunately, many of the techniques are complex, costly and still fail to overcome all the drawbacks.

SUMMARY OF THE INVENTION

The invention overcomes the above-mentioned problems by providing a method and apparatus for efficient power transfer.

According to one aspect of the invention, a first voltage booster is provided for boosting a given input voltage to an intermediate, boosted voltage that is greater than a working voltage required by a working load. The boosted intermediate voltage is divided into two parts: a first intermediate part that is substantially equal to the working load voltage and a second intermediate part that represents the difference between the boosted intermediate voltage and the working load voltage.

The first part of the intermediate voltage is transferred to the working load. An excess power storage means is provided for storing the charge of the second intermediate part. The stored, excess charge is recycled through a second voltage booster. The second voltage booster transforms part or all of the second intermediate part to the level required by the working load and applies the required level to the working load in parallel with the first intermediate part.

The recycling of the excess charge helps to maintain high transfer efficiency.

One embodiment of a power transfer system in accordance with the invention comprises:

(a) a first inductor ($L_1$) for converting a supplied unipolar input voltage ($V_{in}$) into a first current ($I_1$);

(b) a first capacitor ($C_1$), coupled to the first inductor ($L_1$), for converting the first current ($I_1$), or a current derived therefrom ($I_2$), into stored charge (which is expressed across $C_1$ as voltage $V_{C1}$), where the stored charge (or corresponding voltage $V_{C1}$) represents a difference between an intermediate voltage ($V_{N2}$) developed by the first inductor ($L_1$) and a prespecified, working-load voltage ($V_L$);

(c) a first switch ($SW_1$), coupled to the first inductor ($L_1$) and to the first capacitor ($C_1$), for selectively coupling and decoupling the flow of the first current ($I_1, I_2$) into the first capacitor;

(d) a second switch ($SW_2$) for directing part or all of the first current ($I_1, I_2$) to a load;

(e) a second inductor ($L_2$) coupled to the second switch ($SW_2$); and (f) a third switch ($SW_3$) for directing current ($I_3$) developed from the excess charge of the first capacitor ($C_1$) to the second inductor so that the second inductor ($L_2$) can convert the excess charge into a further current ($I_4$) which is then directed into the load.

A method in accordance with the invention comprises the steps of:

(1) Closing the first switch ($SW_1$) for a first time period ($T_{1\text{-}ON}$) so as to build up the level of the first current $I_1$ flowing through the first inductor $L_1$;

(2) Opening the first switch for a subsequent, second time period ($T_{2\text{-}OFF}$) so as to deliver the current built up in the first inductor ($L_1$) to the first capacitor and the load;

(3) Closing the first switch for a subsequent, third time period ($T_{3\text{-}ON}$) so as to couple excess charge in the first capacitor to the second inductor ($L_2$) thereby converting the excess charge into current ($I_3$) flowing through the second inductor ($L_2$); and (4) Opening the first switch for a subsequent, fourth time period ($T_{4-OFF}$) so as to transfer current ($I_4$) built up in the second inductor ($L_2$) to the load.

A further method in accordance with the invention comprises the step of controlling the openings and closings of the first switch ($SW_1$) such that the magnitude of the first current ($I_1$) increases and decreases in correspondence to increases and decreases of the supplied unipolar input voltage ($V_{in}$) thereby causing the power factor of the supplied unipolar input voltage ($V_{in}$) and the first current ($I_1$) to approach 100%.

Further aspects of the invention will become evident in the below detailed description.

BRIEF DESCRIPTION OF THE DRAWINGS

The below detailed description makes reference to the accompanying drawings, in which.

DETAILED DESCRIPTION

Figure 1A:
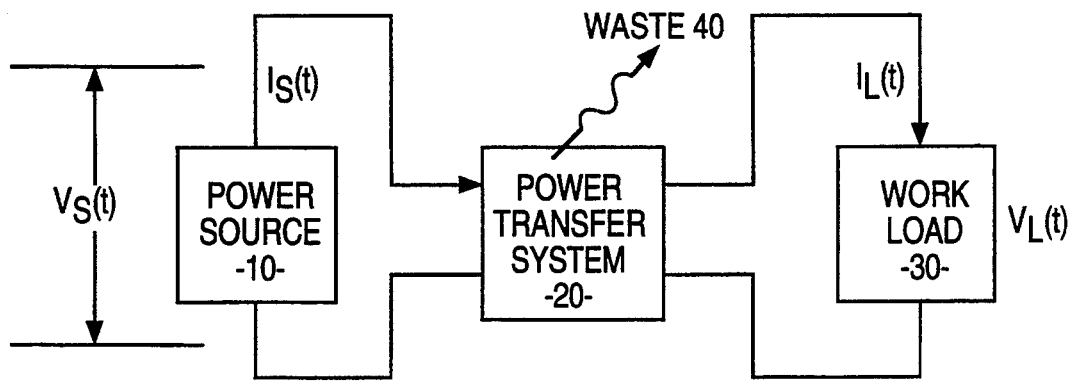
FIG. 1A is a general diagram of a power transfer system.

Referring to FIG. 1A, a general diagram of a power transfer system is shown. A power source 10 generates electric power having a constant or time-varying voltage $V_S(t)$ and a corresponding current $I_S(t)$.

A power transfer system 20 transfers the generated power $V_S(t) \cdot I_S(t)$ to a working load 30. Voltage across the working load is represented as $V_L(t)$. Current through the load is represented as $I_L(t)$.

In cases where the working load 30 requires power of a form: $V_L(t) \cdot I_L(t)$ that is different from that of the generated power, $V_S(t) \cdot I_S(t)$, the power transfer system 20 also converts the form of the generated power to that required by the working load 30. Inefficient power transfer and/or conversion diverts some of the generated energy away from the working load 30 in the form of waste heat 40 or other waste energy.

Figure 1B:
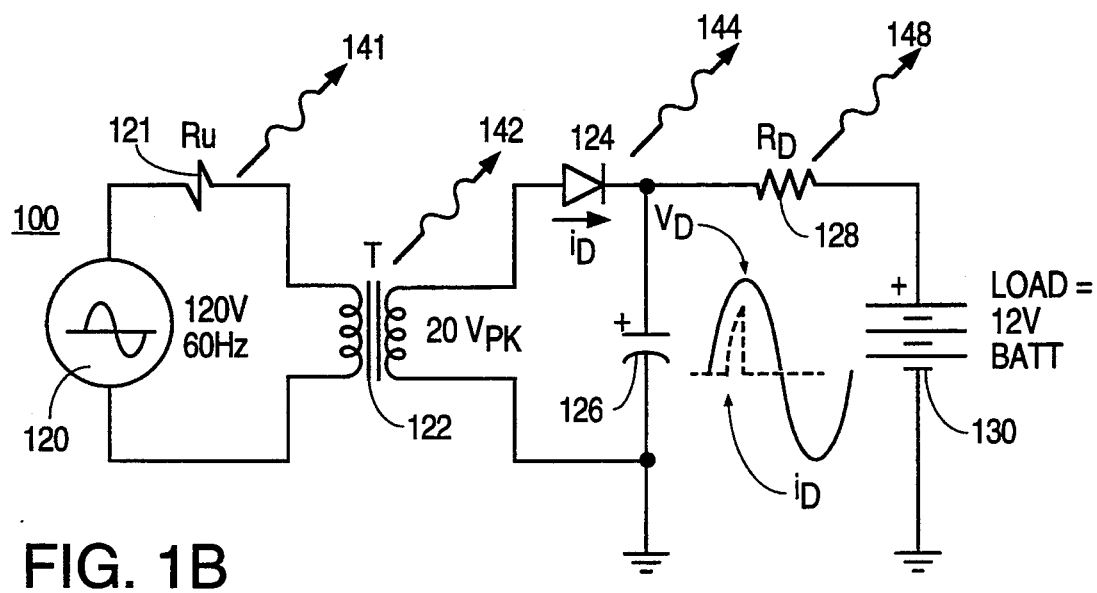
FIG. 1B is a schematic of a hypothetical, relatively inefficient power transfer system.

FIG. 1B illustrates more specifically how waste energy might be produced. A hypothetical, and relatively inefficient, power transfer system 100 is diagrammed in FIG. 1B for this purpose. Power transfer system 100 consists of a 120 V, 60 Hz alternating current (AC) source 120, a utility line 121 having parasitic resistance $R_U$, a step-down transformer 122 connected to the utility line 121, a half-wave rectifier (diode) 124 connected to the low voltage side of transformer 122, a filter capacitor 126 coupled across the output of the half-wave rectifier and a voltage-dropping resistor 128 interposed between the filter capacitor 126 and the load 130. The load 130 of the illustrated case is a 12 VDC lead-acid or other rechargeable battery which is to be charged by energy transferred from power source 120 to the load 130 by way of elements 121, 122, 124, 126 and 128.

Circuit parameters assumed for the earlier-provided background example are again used here. Step-down transformer 122 converts the 120 VAC, 60 Hz utility line signal into a 60 Hz sinusoidal voltage having a peak-to-peak magnitude of 40 volts. Diode 124 charges the filter capacitor 126 to a peak 20 volt DC level. Voltage-dropping resistor 128 absorbs the voltage difference between the 20 V peak across capacitor 126 and the approximately 12 or less volts required by the load 130.

Voltage at the anode of diode 124 is graphed within FIG. 1B as solid curve $V_D$. Current through diode 124 is graphed as dashed waveform $i_D$. Note that diode current $i_D$ is nonzero in only a small portion of each 60 Hz cycle and that it spikes nonsinusoidally during the time that it is nonzero.

The spike-shaped, nonsinusoidal waveform of diode current $i_D$ disadvantageously produces a low power factor and harmonic distortion. This causes undesired power losses 141 in the utility line 121 and further losses 142 in transformer 122.

Additional losses 144 are typically incurred in diode 124 due to forward bias drop when the spike of current waveform $i_D$ is relatively large. More losses 148 develop in voltage-dropping resistor 128 because of the difference between the power form found in filter capacitor 126 and that required by load 130. The greater the difference, the greater the size of power loss 148.

Although previously mentioned, it is worthwhile to note again that power transfer system 100 can not be used with a load requiring a working voltage of more than 20 VDC because the output of transformer 122 is limited to 20 V peak.

It is not advisable to use power transfer system 100 with a load requiring a working voltage substantially less than 20 VDC because the power loss 148 of voltage-dropping resistor 128 can become excessive. It is not advisable to use power transfer system 100 with a power source 120 of a voltage substantially less than 120 VAC (assuming the load voltage is fixed to 12 VDC) because the voltage at the low-voltage side of transformer 122 might be too small to forward bias diode 124.

Moreover, it is not advisable to use power transfer system 100 with a power source 120 having a frequency or waveform substantially different from a 60 Hz sine wave because this may be incompatible with the design parameters chosen for transformer 122 and filter capacitor 126. And most importantly of all, it is not advisable to use power transfer system 100 with a power source 120 having any substantial DC component as part of its source energy because such a DC component would waste away as part of energy losses 141 and 142 from utility line resistance $R_U$ and transformer 122.

Figure 2:
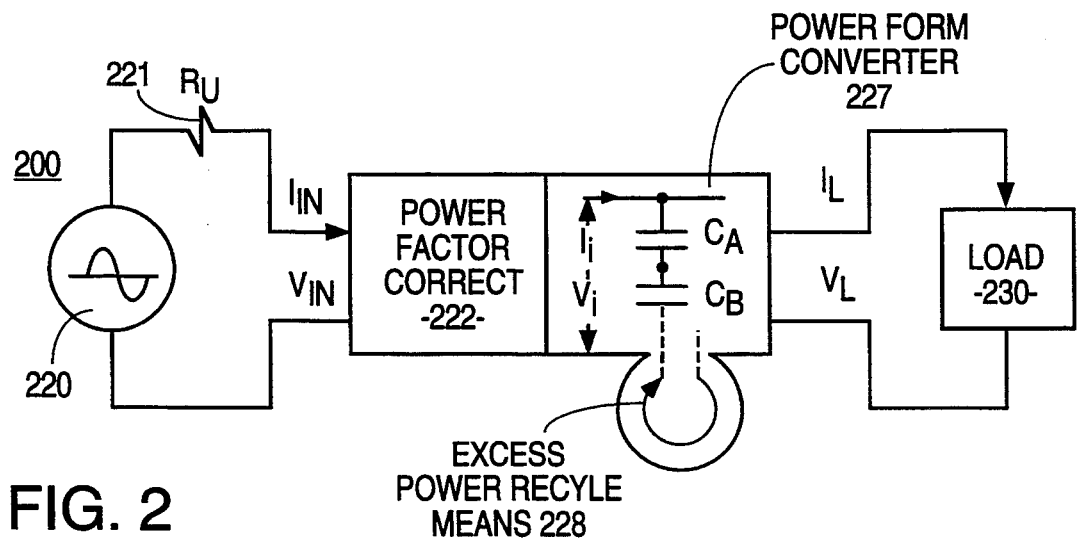
FIG. 2 is a block diagram of an efficient power transfer system in accordance with the invention.

FIG. 2 is a block diagram of a power transfer system 200 in accordance with the invention. Power source 220 supplies input voltage $V_{IN}$ and input current $I_{IN}$ to power-factor correcting unit 222. Power-factor correcting unit 222 controls the input current $I_{IN}$ such that the input current $I_{IN}$ substantially follows increases and decreases in the input voltage $V_{IN}$. This increases the power factor, reduces harmonic distortions, and thereby helps to minimize losses in the parasitic line resistance 221 and utility step-down or step-up transformers (not shown).

A power form converter 227 is further provided in system 200 for converting the input power form, $Px_{IN} = I_{IN}(t) \cdot V_{IN}(t)$ to a load power form, $Px_L = I_L(t) \cdot V_L(t)$ that is more appropriately applicable to working load 230. An intermediate power form generator (not shown) is provided within power form converter 227 for converting the input power form, $Px_{IN} = I_{IN}(t) \cdot V_{IN}(t)$ into an internal, intermediate power form, $Px_i = I_i(t) \cdot V_i(t)$ where one of the intermediate power form parameters, $I_i(t)$ or $V_i(t)$, is of a magnitude greater than that of a corresponding parameter, $I_L(t)$ or $V_L(t)$, that is to be developed at the load 230.

A power form splitter (e.g., capacitors $C_A$ and $C_B$) is further provided within power form converter 227 for splitting the internal, intermediate power form, $Px_i = I_i(t) \cdot V_i(t)$ into two parts, $Px_{iA} = I_{iA}(t) \cdot V_{iA}(t)$ and $Px_{iB} = I_{iB}(t) \cdot V_{iB}(t)$, where at least one of the split power form parameters, $I_{iA}$ or $V_{iA}$, or $I_{iB}$, or $V_{iB}$, matches a corresponding parameter of the load power form, $Px_L = I_L(t) \cdot V_L(t)$.

Of importance, an excess power storage means (e.g., capacitor $C_B$) and an excess power recycling means 228 are provided for temporarily absorbing differences between the input and load power forms and for recycling part or all of the stored difference back to the load. The excess power storing means (e.g., capacitor $C_B$) and recycling means 228 replace the traditional voltage-dropping resistor 128 ($R_D$) of FIG. 1B, and in so doing, eliminate the energy losses 148 associated with that voltage-dropping resistor 128.

By way of simple example, assume that a first part, $V_{iA}$, of intermediate voltage $V_i(t) = V_{iA}(t) + V_{iB}(t)$ matches the voltage parameter $V_L$ required by working load 230. Assume that first voltage part $V_{iA}$ develops across capacitor $C_A$ and that second voltage part $V_{iB}$ develops across capacitor $C_B$. In such a case, the first voltage part $V_{iA}$ is transferred to the working load 230 and the energy of second voltage part $V_{iB}$ is temporarily stored. Excess power recycling means 228 recycles part or all of the stored, excess energy of second voltage part $V_{iB}$, converts the recycled part into a form matching that required by the working load 230, and delivers the matched form to the working load 230. Any left-over portion of the recycled power is stored back into the excess voltage storing capacitor, $C_B$, and later recycled again, either by itself or in combination with additional excess power developed in a next cycle of the system.

Figure 3:
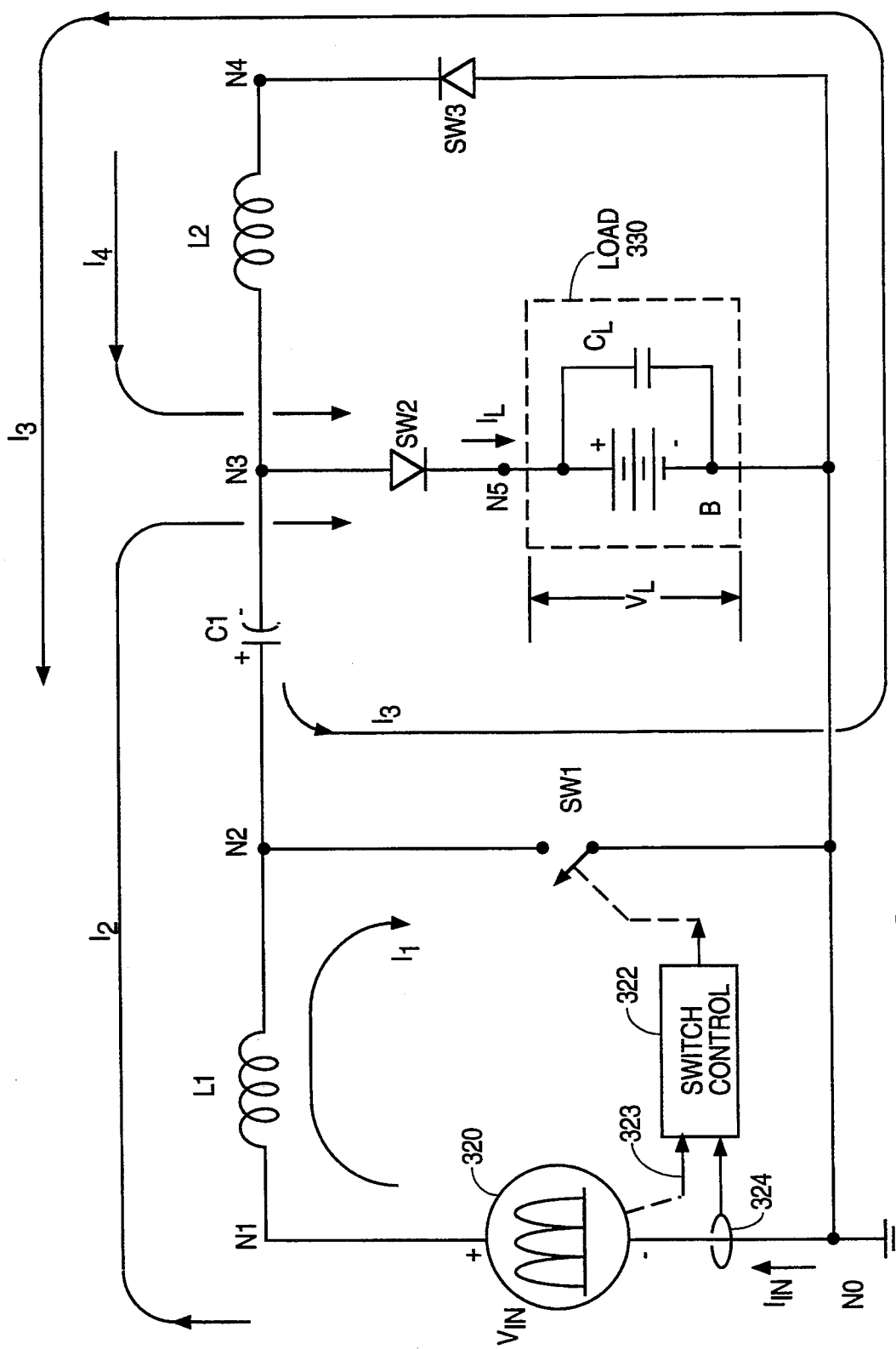
FIG. 3 is a schematic diagram of a first "double-T" converter (TT converter) in accordance with the invention.

FIG. 3 shows a voltage splitting embodiment 300 of the invention in more detail. Embodiment 300 is referred to as a "double-T" or "TT converter circuit" 300.

Various circuit nodes in FIG. 3 are labeled as N0 through N5. Node N0 is ground. For the sake of symbolic brevity, the voltage difference between any node Nx and ground node N0 is be denoted as $V_x = V_{Nx} - V_{N0}$. The voltage difference between node N1 and ground node N0 is therefore symbolized as $V_1$. The symbol $V_{21}$ is used to denote the voltage difference $V_2 - V_1$ between respective nodes N2 and N1.

There are four current flows in TT converter circuit 300 denoted as $I_1$ through $I_4$. Arrowheaded lines labeled $I_1$ through $I_4$ are drawn adjacent to the components through which the respective currents $I_1 - I_4$ flow.

A positive (unipolar) voltage source 320 supplies input power $Px_{IN} = I_{IN}(t) \cdot V_{IN}(t)$ to the TT converter circuit 300. The positive terminal of unipolar voltage source 320 connects to node N1. Its negative terminal connects to ground node N0. It is assumed for now that unipolar voltage source 320 supplies a time-invariant DC voltage level $V_{IN}$ greater than zero. It will be seen later that any unipolar voltage source of sufficiently low-frequency, including a full-wave rectified 120 Hz source, can also serve as positive-voltage source 320.

A first inductor $L_1$ connects between nodes N1 and N2. A charge-storage means such as capacitor $C_1$ is provided between nodes N2 and N3. Capacitor $C_1$ can be a polarized capacitor (e.g. electrolytic capacitor), in which case its positive terminal connects to node N2. A second inductor $L_2$ is provided between nodes N3 and N4.

A first switch $SW_1$ is provided between nodes N2 and N0 (ground). Switch control unit 322 selectively closes or opens first switch $SW_1$ to respectively make switch $SW_1$ conductive or nonconductive. In a preferred embodiment, switch control unit 322 includes a voltage sensing means 323 for detecting the magnitude of input voltage $V_{IN}$ and a current sensing means 324 for detecting the magnitude of input current $I_{IN}$.

A DC working load 330 is provided between nodes N5 and N0. The positive terminal of working load 330 connects to node N5. The illustrated example shows load 330 as including a chargeable battery B (e.g. lead-acid or NiCd). An interesting feature of working load 330 is that it self-regulates the voltage $V_L$ across itself to a level approximately equal to that preferred for performing its work (storing energy) with optimum efficiency. Another interesting feature of working load 330 is that it has an inherent electrical capacitance (or an externally added capacitor) for allowing it to accumulate charge and to convert the accumulated charge into an expressed voltage, $V_L$.

It will be seen later that load 330 does not necessarily have to include a chargeable battery B. It can include any other current-absorbing means (e.g., a resistor and-/or capacitor). The load 330 preferably includes a low-loss means (e.g., a capacitor) for converting the absorbed current into a voltage and for maintaining a pre-specified voltage level $V_L$ between nodes N5 and N0.

A load capacitance $C_L$ is shown strapped across the load battery B to represent either the inherent internal capacitance of the battery B or the combination of that internal capacitance and an external capacitor connected in parallel to the battery B. Use of an external capacitor is encouraged because most batteries have parasitic, internal resistance and inductance interposed between the battery terminals and the internal capacitance of the battery. Switched mode operation tends to produce current spikes at node N5, load capacitance $C_L$ helps to absorb these spikes and to filter them out before they reach parts of the working load (e.g. plates of battery B) that may be adversely affected by such spikes.

A second switch (diode) $SW_2$ is provided between nodes N3 and N5 for directing currents from node N3 to the positive terminal (N5) of load 330. The current entering node N5 is denoted as load current $I_L$.

A third switch (diode) $SW_3$ is provided for directing a discharge current $I_3$ into second inductor $L_2$.

The TT converter circuit 300 operates as follows. Assume an initial condition where no currents flow through inductors $L_1$ and $L_2$, no magnetic fields exist in $L_1$ and $L_2$, and no charge is yet developed across capacitor $C_1$.

During a first time period $T_1$, first switch $SW_1$ closes (becomes conductive). First inductor $L_1$ integrates the input voltage $V_{IN}$ to produce a first circulating current $I_1$ flowing around the loop formed by unipolar voltage source 320, first inductor $L_1$ and closed first switch $SW_1$. The magnitude of first current $I_1$ increases over time in accordance with below equation Eq. 1.1:

$$I_1(t) = \frac{1}{L_1} \cdot \int_0^{T_1} V_{12}(t)\, dt + I_1(0) \quad \{Eq. 1.1\}$$

The duration $T_{1-ON}$ for which first switch $SW_1$ remains closed determines a peak level $I1(1)$ to which the magnitude of the first current $I_1$ will rise during this first closure of first switch $SW_1$.

Figure 4:
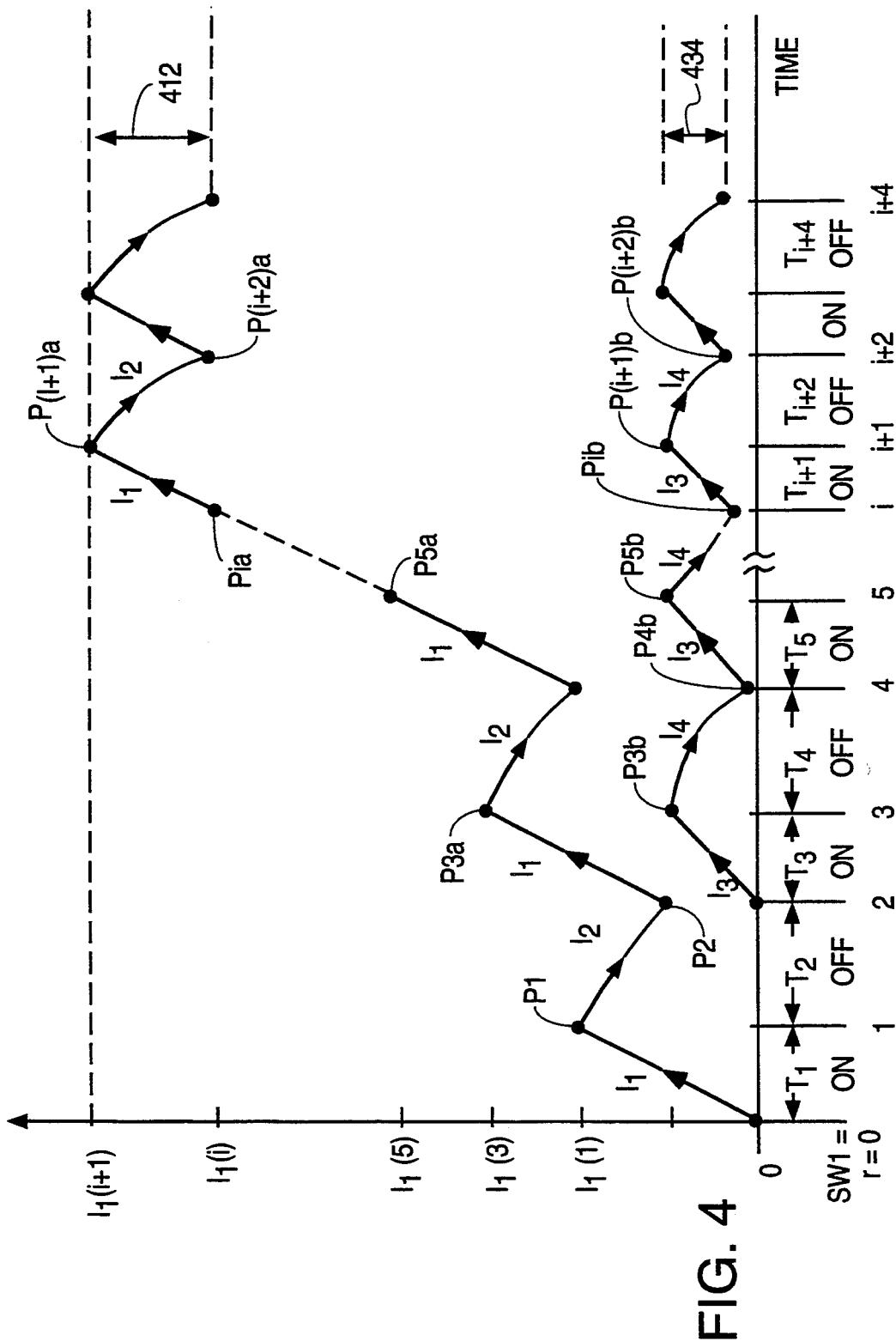
FIG. 4 is a current versus time graph showing how the magnitudes of currents I1 through I4 of FIG. 3 relate to one another and to time.

FIG. 4 shows the current build up in first inductor $L_1$ over the initial time duration $t=t_0$ to $t=t_1$. The build up is linear for the case where the source voltage $V_{IN}$ is constant. The slope of the build up is $V_{12}/L_1$.

In an immediately subsequent, second time period $T_{2-OFF}$, first switch $SW_1$ opens. The magnetic field of first inductor $L_1$ begins to collapse and the current that has been built up in the first inductor $L_1$ then flows as second current $I_2$ through respective components $L_1$, $C_1$, $SW_2$ and load 330. Load capacitance $C_L$ accumulates the charge of current $I_2$. The voltage at node N2 during time period $T_{2-OFF}$ is given by below equation Eq. 1.2:

$$V_2(t) = V_{IN} - L_1 \cdot \frac{dI_2}{dt} \quad \{Eq. 1.2\}$$

Because energy is being drawn from it, and the magnetic field of first inductor $L_1$ is collapsing during this period, $T_2$, the magnitude of second current $I_2$ is decreasing (see FIG. 4 time duration $t=t_1$ to $t=t_2$). As a consequence, $V_2$ is boosted to a magnitude higher than that of input voltage $V_{IN}$. The values of first inductor $L_1$ and capacitor $C_1$ are preferably selected to correspond with first switching duration $T_1$ and second switching duration $T_2$ such that voltage $V_2$ will be greater than the working voltage $V_L$ of load node N5.

Capacitor $C_1$ charges to a voltage approximately equal to the difference between boost voltage $V_2$ and load voltage $V_L$. (Second switch $SW_2$ is approximated as having a zero voltage drop.) Thus, an excess part of the intermediate power form, $Px_i = I_i(t) \cdot V_i(t) = I_2(t) \cdot V_2(t)$, is absorbed by first capacitor $C_1$ in an essentially lossless manner rather than being dissipated away.

During an immediately subsequent, third time period $T_{3-ON}$, first switch $SW_1$ closes again. The current $I_1$ of first inductor $L_1$ builds up again as a result of having positive voltage $V_{IN}$ strapped across its nodes, N1 and N2. At the same time, part or essentially all of the excess voltage $V_{23}$ which developed across capacitor $C_1$ during time period $T_{2-OFF}$ discharges in the form of a right-side circulating current $I_3$. This right-side circulating current $I_3$ flows through now-closed first switch $SW_1$, through current-directing switch $SW_3$ and through second inductor $L_2$.

Second inductor $L_2$ integrates the excess voltage of capacitor $C_1$ in accordance with below equation Eq. 1.3:

$$I_3(t) = \frac{1}{L_2} \cdot \int_0^{T_3} V_{23}(t)\, dt + I_3(0) \quad \{Eq. 1.3\}$$

In FIG. 4, excess voltage $V_{23}$ is assumed to be constant over the duration $t=t_2$ to $t=t_3$ of time period $T_3$. The slope of the build up of third current $I_3$ is then given by $V_{23}/L_2$.

During an immediately subsequent, fourth time period $T_{4-OFF}$, first switch $SW_1$ again opens. Current $I_2$ again charges capacitor $C_1$. At the same time, the collapsing magnetic field of second inductor $L_2$ produces a fourth current $I_4$ which flows through second switch SW$_2$ into load 330. The total current into load 330 is now equal to the sum I$_L$=I$_2$+I$_4$.

The process repeats thereafter, with each closing of first switch SW$_1$ replenishing the currents of first and second inductors L$_1$ and L$_2$; and with each opening of first switch SW$_1$ sending a surge of current, I$_L$=I$_2$+I$_4$ into load 330. Load capacitance C$_L$ converts part or all of load current I$_L$ into load voltage V$_L$.

The switching rate of first switch SW$_1$ is preferably set sufficiently high so that input voltage V$_{IN}$ can be modeled as a constant DC level even if it is really a 120 Hz full-wave rectified waveform. The switching rate of first switch SW$_1$ is also preferably set sufficiently high so that load voltage V$_L$ appears to be substantially a DC voltage to the working load 330. A preferred range is 20 KHz to 2 MHz. Operating above 20 KHz (above audio) helps to reduce the physical size of the various circuit components. Operating below 2 MHz is desired because presently available electronic switches begin to exhibit excessive switching loss above this frequency. (Higher switching frequencies will of course become practical if and when switches with small loss above 2 MHz become available.) Although not shown in FIG. 3, a low-pass filter network composed of further inductors and capacitors may be interposed between load node N5 and the working load 330, if desired, to smooth out the waveform of the load voltage V$_L$.

Now that the basic operation of the TT converter circuit 300 has been explained, it is worthwhile to review the circuit again and note a few interesting points.

A first noteworthy point is that power source 320 is continuously coupled to the first inductor L$_1$. The power source current I$_{IN}$ is at all times equal to one of currents I$_1$ or I$_2$. A continuous transfer of power can be maintained from unipolar voltage source 320 into the remainder of the TT converter circuit 300 independently of the instantaneous power form then being delivered to working load 330.

If we assume an ideal first switch SW$_1$ and ideal inductor L$_1$, the power source current I$_{IN}$ can be maintained above zero even when the power source voltage V$_{IN}$ is relatively small. A continuous, positive power flow, Px$_{IN}$=V$_{IN}$·I$_{IN}$ can be maintained therefore at the input side of the TT converter circuit 300 even for very small values of source voltage V$_{IN}$.

Referring to above equation Eq. 1.2, note that first inductor L$_1$ boosts the voltage of node N2 above that of source voltage V$_{IN}$ as long as dI$_2$/dt remains negative. With appropriate selection of first inductor L$_1$, the TT converter circuit 300 can be used to power a load 330 even if the voltage required by the load, V$_L$, is larger than the power source voltage V$_{IN}$.

On the other hand, if the load voltage V$_L$ has to be smaller than the power source voltage V$_{IN}$, capacitor C$_1$ absorbs the excess voltage. The TT converter circuit 300 can therefore be used with numerous combinations of input and output voltages; including a relatively small unipolar source voltage, V$_{IN}$, and a like-polarized, substantially larger load voltage, V$_L$; or a relatively large unipolar source voltage, V$_{IN}$, and a like-polarized, substantially smaller load voltage, V$_L$.

Another important aspect of the invention is that the excess voltage stored across capacitor C$_1$ is not wasted away as heat. Rather it is recycled by converting it into current I$_4$ which then flows into load 330. Power transfer efficiency is therefore kept relatively high.

A correlated further aspect of the invention is that a sequence of switched inductors and capacitors are provided for successively converting a given power form from a voltage based one to a current based one and then from a current based power form to a voltage based one, and so forth. First inductor L$_1$ and first switch SW$_1$ convert input voltage V$_{IN}$ into first current I$_1$. First capacitor C$_1$ and load capacitance C$_L$ then convert the subsequent second current I$_2$ into load voltage V$_L$ and excess voltage V$_{23}$. Second inductor L$_2$ and third switch SW$_3$ convert excess voltage V$_{23}$ into third current I$_3$. Load capacitance C$_L$ and second switch SW$_2$ convert the subsequent fourth current I$_4$ into load voltage V$_L$.

Yet another point to note is that the TT converter circuit 300 can be made with a relatively small number of components: L$_1$, L$_2$, C$_1$, SW$_1$, SW$_2$, SW$_3$ and control circuit 322. Control mechanisms 323 and 324 are optional. If desired, switch control unit 322 can be a digital oscillator which simply opens and closes first switch SW$_1$ at a prescribed rate and duty cycle.

One more point of note is that a series of TT converter circuits 300 can be cascaded one after the next or connected to a common power source when spatial distribution of the power storage is desired. Because the input voltage V$_{IN}$ of the TT converter circuit 300 can be a unipolar voltage of almost arbitrary magnitude and the output load voltage V$_L$ is a unipolar voltage of a desired or arbitrary magnitude, the output of a first TT converter circuit 300 can serve as the input for a second TT converter circuit 300 and so on.

Referring to FIG. 4, the ON/OFF cycles of first switch SW$_1$ and corresponding changes in currents I$_1$–I$_4$ are shown. Illustrated time durations T$_{1-ON}$, T$_{2-OFF}$, T$_{3-ON}$, T$_{4-OFF}$, . . . T$_{i+4-OFF}$ are not to scale. Switch control unit 322 (FIG. 3) can be designed to set the durations of ON/OFF periods T$_1$, T$_2$, etc., as desired.

In FIG. 4, first duration T$_1$ is set to allow the left-hand circulating current I$_1$ climb from zero to a first magnitude point P$_1$. Second duration T$_2$ is set to drop the magnitude of second current I$_2$ from point P$_1$ to point P$_2$. Note that second point P$_2$ is above zero and below first point P$_1$.

Third time duration T$_3$ is adjusted to raise the left-side circulating current I$_1$ from second point P$_2$ to third point P$_{3a}$. Note that third point P$_{3a}$ is above first point P$_1$. The overall magnitude of left-hand circulating current I$_1$ continues to increase as indicated by subsequent points P$_{5a}$, P$_{ia}$, P$_{(i+1)a}$. The overall magnitude increase of first current I$_1$ continues as long as counterpart decreases caused by the energy withdrawing current I$_2$ are smaller than the increases caused by the energy resupply surges of first current I$_1$.

When the magnitude of current I$_1$ reaches a maximum, steady state level, I$_i$(i+1), at time point t=t$_{i+1}$, the next time period T$_{i+2}$ is adjusted so that the most recent increase of current I$_1$ from point P$_{ia}$ to point P$_{(i+1)a}$ will be matched by a corresponding decrease of second current I$_2$ from point P$_{(i+1)a}$ to point P$_{(i+2)a}$. Point P$_{(i+1)a}$ therefore corresponds to the maximum steady state level I$_i$(i+1) of the left-hand circulating current I$_1$. Point P$_{(i+2)a}$ similarly corresponds to a minimum, steady state level I$_1$(i) of the left-hand circulating current I$_1$. The steady state range for first and second currents I$_1$ and I$_2$ is indicated at 412.

The same openings and closings of first switch SW$_1$ also define the build-up and steady state range for third and fourth currents, I$_3$ and I$_4$. In third time period T$_{3-ON}$, third current I$_3$ builds from zero to point P$_{3b}$. In fourth time period $T_4$, fourth current $I_4$ drops from point $P_{3b}$ to point $P_{4b}$.

Although point $P_{3b}$ is drawn below point $P_{3a}$ in FIG. 4, it is to be understood that this not a necessary operating constraint. The relation between the "a" points (e.g., $P_{3a}$, $P_{4a}$, $P_{5a}$) and the "b" points (e.g., $P_{3b}$, $P_{4b}$, $P_{5b}$) is not to scale. The magnitudes of third current $I_3$ and fourth current $I_4$ can be larger or smaller than those of first current $I_1$ and second current $I_2$. It depends on the type of power form conversion taking place. If an essentially lossless conversion is assumed, the average input power, $V_{IN} \cdot I_{IN}$, will be equal to the average output power $V_L \cdot I_L$. If $V_{IN} > V_L$ then $I_{IN} < I_L$. On the other hand, if $V_{IN} < V_L$ then $I_{IN} > I_L$. Since $I_{IN}$ is equal to one or the other of $I_1$ and $I_2$, and since $I_L$ is equal to the sum of $I_2$ and $I_4$, the relative magnitudes of first through fourth currents $I_1$–$I_4$ will depend on the relation between the input voltage $V_{IN}$ and the load voltage $V_L$.

Point $P_{4b}$ is intentionally not shown in FIG. 4 because there are two fundamentally different scenarios possible. In one scenario, point $P_{4b}$ is at a current level above zero and positioned at time point $t = t_4$. If this is the case, third current $I_3$ climbs from above-zero point $P_{4b}$ in subsequent time period $T_5$ to point $P_{5b}$. The average magnitude of third current $I_3$ therefore increases when going from point $P_{3b}$ to point $P_{5b}$. This increase of average magnitude can continue until a steady state maximum level, $P_{(i+1)b}$, is reached.

In an alternate scenario, point $P_{4b}$ is located at the zero current level and positioned either at time $t = t_4$ or somewhere between time points $t_3$ and $t_4$ ($t_3 < t \leq t_4$). In this case, third current $I_3$ climbs from the zero-level point $P_{4b}$ to point $P_{5b}$ in fifth time duration $T_5$. Point $P_{5b}$ can be, but is not necessarily, higher than point $P_{3b}$. This alternate scenario is referred to as the "discontinuous conduction" mode because current conduction through second inductor $L_2$ is discontinuous.

The first scenario, in which point $P_{4b}$ is above the zero current level, and subsequent points $P_{ib}$, $P_{(i+2)b}$, etc., are also above zero, is referred to as the "continuous conduction" mode because current flow through second inductor $L_2$ is continuous in this mode. A steady state range for a continuous conduction mode is shown at 434.

Generally speaking, the continuous conduction mode transfers power from source to load more smoothly and at a slower pace than does the discontinuous conduction mode. Nonetheless, the discontinuous conduction mode is generally preferred over the continuous conduction mode. (An exception to this general preference occurs for the embodiment of FIG. 14, which is described later.) There are several reasons for the general preference of the discontinuous conduction mode.

When the switching rate of first switch $SW_1$ is being controlled solely for the purpose of correcting the source power factor, there is an underlying assumption made that, during steady state, the working load 330 fully absorbs the power $V_L \cdot I_L$ that is sent to it in every open/close cycle of first switch $SW_1$. This assumption is difficult to meet if the power absorbing rate of the working load 330 changes or the power delivery rate from voltage source 320 changes.

The power $V_L \cdot I_L$ sent to load 330 can be viewed as having two subcomponents: a first power part, $V_L \cdot I_2$, and a second power part, $V_L \cdot I_4$. If the $I_2$ factor of first power part $V_L \cdot I_2$, is being slowly varied to correct the input power factor, it is preferable to arrange the power delivery rates of the two parts $V_L \cdot I_2$ and $V_L \cdot I_4$, to the load such that the second power part, $V_L \cdot I_4$, is fully delivered (and absorbed by the load) in less time than that of the open/close cycle of first switch $SW_1$. This provides some slack time for completing delivery and absorption of the variable first power part, $V_L \cdot I_2$. The discontinuous conduction mode provides such slack time.

Another way of viewing this is to realize that, given a condition where fourth current $I_4$ drops to zero well before the end of switch-OFF periods $T_4$, $T_6$, $T_{i+2}$, $T_{i+4}$, etc., the remaining portion of the cycle time of the first switch $SW_1$ can be varied flexibly as desired (by varying the duration of switch-OFF periods $T_4$, $T_6$, $T_{i+2}$, $T_{i+4}$, etc.), to more precisely set the steady state range 412 of first and second currents $I_1$ and $I_2$ independently of the steady state range for third and fourth currents $I_3$ and $I_4$.

Also, the discontinuous conduction mode is preferred because the physical size of first capacitor $C_1$ and second inductor $L_2$ can be reduced as the time for delivering second power part $V_L \cdot I_4$ to the load is reduced.

DISCONTINUOUS CONDUCTION MODE

In the discontinuous conduction mode, it is desirable to maintain the condition $V_{N2} > V_{N1}$ at all times while first switch $SW_1$ is open so that second current $I_2$ continuously moves unidirectionally toward the load 330. It is necessary to assure that fourth current $I_4$ drops to zero within the switch OFF time periods $T_4$, ... $T_{i+2}$, $T_{i+4}$, etc.

The inductance of second inductor of $L_2$ is preferably set such that first capacitor $C_1$ does not completely discharge during switch ON periods $T_3$, ..., $T_{i+1}$, etc. This is done in order to maintain some residual charge across first capacitor $C_1$ at all times so that power flow from first capacitor $C_1$ to second inductor $L_2$ does not stop before the end of one of switch ON periods $T_3$, ..., $T_{i+1}$, etc. Temporal discontinuities in the transfer of power from a given source ($C_1$) to a given load ($L_2$) tend to reduce the efficiency of the power transfer.

When first switch $SW_1$ is closed and first capacitor $C_1$ transfers its excess energy in the form of third current $I_3$ to second inductor $L_2$, the circuit can be modeled as a simple LC circuit with sinusoidal response. The time for taking excess voltage $V_{23}$ from a peak level to zero is equal to one-quarter of the natural period of the LC circuit formed by capacitor $C_1$ and second inductor $L_2$. The switch ON times $T_3$, etc. are preferably kept below this quarter cycle duration to prevent full discharge of capacitor $C_1$. The preferred maximum bound on $T_3$ is therefore:

$$T_{3max} = \frac{\pi}{2} \cdot \sqrt{L_2 \cdot C_1} \qquad \{\text{Eq. 2.1}\}$$

When second inductor $L_2$ transfers its excess energy in the form of fourth current $I_4$ to second inductor $L_2$, the circuit can be modeled as a simply as inductor $L_2$ with voltage $V_L$ applied across it. The time for dropping fourth current $I_4$ from a peak level to zero is approximately equal to the time needed for linearly discharging $I_{3peak}$ to zero at a slope of $V_L/L_2$. Since we wish to assure complete discharge of fourth current $I_4$, the preferred minimum bound on $T_4$ is given by below equation Eq. 2.2:

$$T_{4min} = \frac{L_2}{V_L} \cdot I_{3peak} \quad \{Eq.\ 2.2\}$$

It is advantageous to maintain some residual current flow through first inductor $L_1$ at all times so that power flow from first inductor $L_1$ to first capacitor $C_1$ by way of second current flow $I_2$ does not stop before the end of one of switch OFF time periods $T_4, \ldots T_{i+2}, T_{i+4}$, etc. As mentioned above, temporal discontinuities in power transfer from a given source ($L_1$) to a given load ($C_1$ and $C_L$) tends to reduce the efficiency of the power transfer.

Because the steady-state voltage across first capacitor $C_1$ cancels out the difference between input voltage $V_{IN}$ and load voltage $V_L$, the circuit which conducts second current $I_2$ can be modeled as a simple LC circuit with sinusoidal response. The time for dropping second current $I_2$ from a peak level to zero is equal to one-quarter of the natural period of the LC circuit formed by capacitor $C_1$ and first inductor $L_1$. The switch OFF times $T_2$, etc. are preferably kept below this quarter cycle duration to prevent full discharge of first inductor $L_1$. The preferred maximum bound on $T_2$ is therefore:

$$T_{2max} = \frac{\pi}{2} \cdot \sqrt{L_1 \cdot C_1} \quad \{Eq.\ 2.3\}$$

For simplicity, third switching duration $T_3$ can be set equal to first switching duration $T_1$ and fourth switching duration $T_4$ can be set equal to second switching duration $T_2$. In such a case, a free-running oscillator with a period of $T_1 + T_2$ can be used to control the switching of first switch $SW_1$. The preferred upper bound on period $T_1 + T_2$ is obtained from above equations Eq. 2.1 and 2.3:

$$T_{3max} + T_{2max} = \frac{\pi}{2} \cdot \sqrt{L_2 \cdot C_1} + \frac{\pi}{2} \cdot \sqrt{L_1 \cdot C_1} \quad \{Eq.\ 2.4\}$$

The preferred lower bound on period $T_1 + T_2$ is derived from above equation Eq. 2.1 and 2.2:

$$T_{1min} + T_{4min} = \frac{k\pi}{2} \cdot \sqrt{L_2 \cdot C_1} + \frac{L_2}{V_L} \cdot I_{3peak} \quad \{Eq.\ 2.5\}$$

Factor k in above equation Eq. 2.5 is selected in the range $0 < k \leq 1$.

FEEDFORWARD POWER FACTOR CORRECTION

Figure 5:
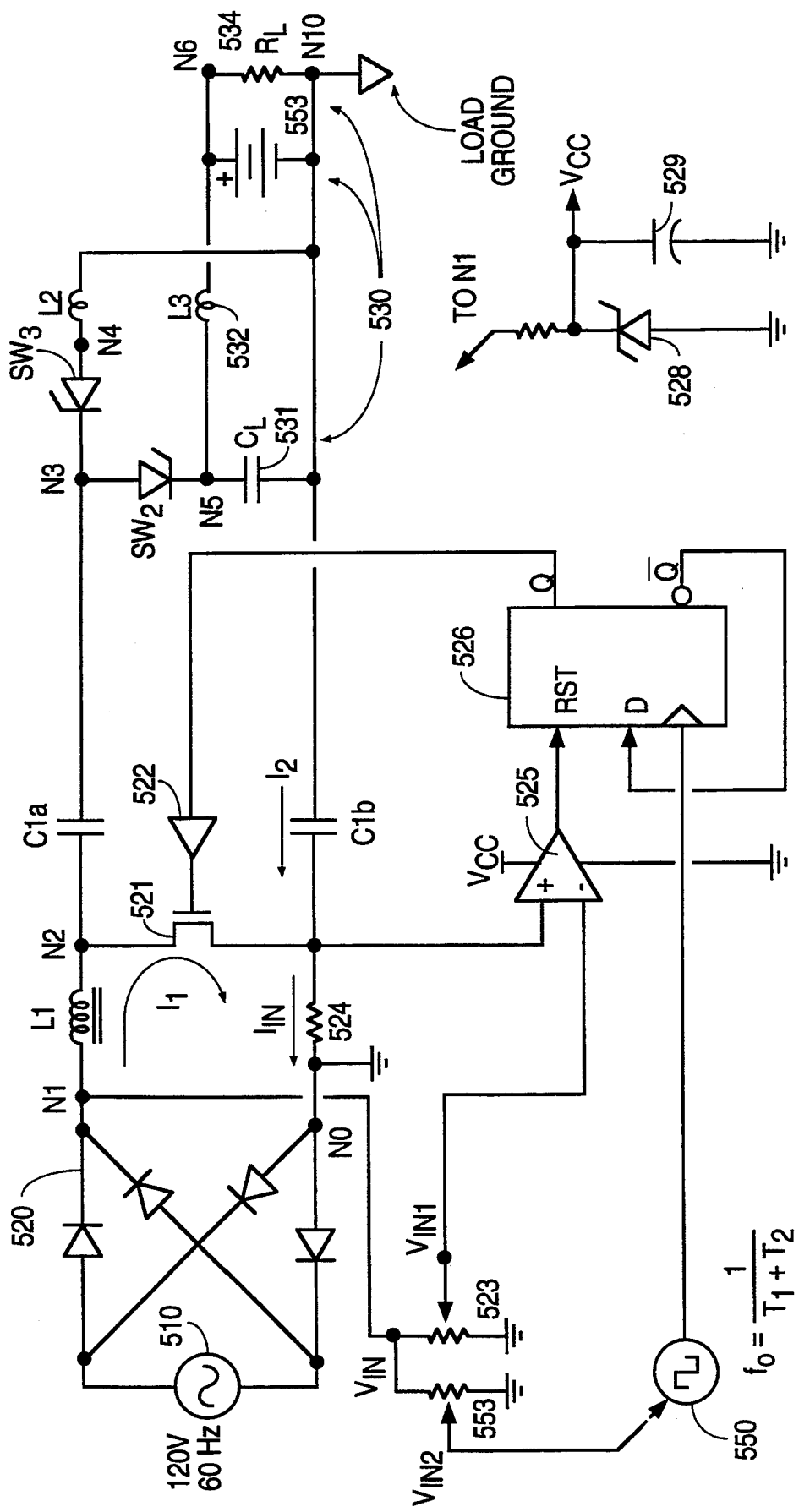
FIG. 5 is a schematic diagram of a second TT converter having a power factor correction mechanism in accordance with the invention.

FIG. 5 shows a schematic of an embodiment 500 of the invention which includes a feedforward control mechanism for maintaining a power factor close to 100% for the source power form, $Px_{IN} = I_{IN}(t) \cdot V_{IN}(t)$. In many instances, like reference symbols and numbers in the "500" series are utilized in FIG. 5 for elements which have like-designated or like-numbered counterparts numbered in the 300 series in FIG. 3.

In circuit 500, alternating current from a 120 VAC 60 Hz power source 510 passes through a full-wave bridge rectifier 520 to produce a unipolar 120 Hz input voltage $V_{IN}$ across nodes N1 and N0. Node N0 is referred to as the source ground here. Note that another node, N10 serves as the load ground and isolation capacitor C1b is interposed between source ground node N0 and load ground node N10. Capacitors $C_{1a}$ and $C_{1b}$ combine in series to perform excess voltage storing function of first capacitor $C_1$ of FIG. 3.

First switch $SW_1$ is formed of an N-channel power MOSFET 521 such as an International Rectifier IRFP250 ™. The source terminal of MOSFET 521 connects to a current sensing node N-2. A current sensor (e.g., resistor) 524 connects the current sensing node N-2 to the source ground node N0. The drain of MOSFET 521 connects to N2. The gate is driven by a gate drive amplifier 522.

The current sensor (resistor) 524 that is placed between nodes N-2 and N0 is used for detecting the magnitude of source current $I_{IN}$. A user-adjustable potentiometer 523 is provided between node N1 and source ground node N0 for developing a scaled first voltage $V_{IN1}$ representing a scaled replica of input voltage $V_{IN}$. The wiper of potentiometer 523 connects to the negative ($-$) input terminal of an operational amplifier 525. The positive ($+$) input terminal of an operational amplifier 529 connects to current sensing node N-2.

Operational amplifier 525 operates as a comparator. It outputs a logic high ("1") level when the sensed source current $I_{IN}$ flowing through current sensor 524 is greater than the scaled first voltage $V_{IN1}$. Comparator 525 outputs a logic low ("0") level when the voltage developed across current sensor 524 is equal to or less than the scaled first voltage $V_{IN1}$.

A flip flop 526, configured to operate as a toggle-type (T-type) flip flop, is provided with its Q output terminal coupled to the input of drive amplifier 522. A digital oscillator 550 operating at a nominal frequency $f_o = 1/(T_1 + T_2)$ and a 50% duty cycle drives the clock input terminal of flip flop 526. The output of comparator 525 connects to the RESET terminal (RST) of flip flop 526.

As long as the output of comparator 525 is at logic low ("0"), the Q output of flip flop 526 freely alternates at frequency $f_o$ between the logic low and high states. First switch $SW_1$ (MOSFET 521) opens and closes in response.

When the output of comparator 525 switches to logic high ("1"), the Q output of flip flop 526 is reset to and remains stuck at the logic low ("0") level and first switch $SW_1$ (MOSFET 521) is forced open. Second current $I_2$ decays until the voltage across current sensor 524 drops below the scaled first voltage $V_{IN1}$. The output of comparator 525 then switches to logic low ("0") and the Q output of flip flop 526 again alternates in response to oscillator 550.

Because first and second currents $I_1$ and $I_2$ track one another and source current $I_{IN}$ is equal to one or the other of first and second currents $I_1$ and $I_2$, circuit 500 operates such that the magnitude of source current $I_{IN}$ generally tracks the magnitude of a full-wave rectified input voltage $V_{IN}$, increasing when input voltage $V_{IN}$ increases and decreasing when input voltage $V_{IN}$ decreases. Depending on the degree to which source current $I_{IN}$ tracks input voltage $V_{IN}$, the power factor at the input of circuit 500 can be made quite large (approaching 100%).

In one version of circuit 500, oscillator 550 is a free running oscillator operating at 24 KHz.

In a second version of circuit 500, oscillator 550 is a voltage controlled oscillator (VCO) whose frequency increases and decreases in correspondence with increases and decreases of input voltage $V_{IN}$. The second version of circuit 500 is preferred in cases where first inductor $L_1$ has a saturatable core and first current $I_1$ rises to levels which drive the core of first inductor $L_1$ close to or into saturation. In such cases, the effective inductance of first inductor $L_1$ decreases as input voltage $V_{IN}$, and consequently source current $I_{IN}$, increases. To counteract this, a second user-adjusted potentiometer 553 is provided for controlling VCO 550 with a scaled second voltage $V_{IN2}$ that replicates the rises and falls of input voltage $V_{IN}$. The frequency of oscillator 550 follows, and in so doing, adjusts the operating characteristics of circuit 500 to give the appearance that first inductor $L_1$ has a constant effective inductance.

Operating power for the oscillator 550, comparator 525, flip flop 526 and drive amplifier 522 can be drawn from the full-wave bridge rectifier 520 or from another supply (not shown). In FIG. 5, resistor 527 couples node N1 to zener diode 528. Zener diode 528 develops a regulated voltage $V_{cc}$ across capacitor 529. Regulated voltage $V_{cc}$ supplies operating power to oscillator 550, comparator 525, flip flop 526 and drive amplifier 522.

In one embodiment of circuit 500, first inductor $L_1$ is a coil wound on a magnetic core to provide an effective inductance of 0.5 milliHenry (500 $\mu$H) at a nominal frequency of $f_o = 24$ KHz. The inductance of first inductor $L_1$ is selected on a first order basis to match the impedance of the power source 510 by using the following equation Eq. 3.1:

$$R_{IN} = \frac{V_{IN(RMS)}}{I_{IN(RMS)}} = 2\pi f_o \cdot L_1 \qquad \{Eq.\ 3.1\}$$

where $f_o$ is the switching frequency of the first switch $SW_1$, $V_{IN(RMS)}$ is the root means square input voltage and $I_{IN(RMS)}$ is the expected root means square input current.

Also in FIG. 5, second inductor $L_2$ is a length of wire having an inductance of half a microHenry (0.5 $\mu$H). Capacitors $C_{1a}$ and $C_{1b}$ have a combined effective capacitance of 0.5 $\mu$F. Third inductor $L_3$ is a length of wire having an inductance of one tenth a microHenry (0.1 $\mu$H). Oscillator 550 operates at a nominal frequency of $f_o = 24$ KHz. Second switch $SW_2$ and third switch $SW_3$ are both Schottky diodes. Note that diode $SW_3$ is positioned between nodes N3 and N4 while second inductor $L_2$ is positioned between nodes N10 and N4.

The load 530 is positioned between nodes N5, N6 and N10. Load 530 can include any one or more of load capacitance $C_L$ (531), filter inductance $L_3$ (532), positioned between nodes N5 and N6), battery 533 and resistance 534 (positioned between nodes N6 and N10). Inductor $L_3$ impedes the passage of $I_4$ current spikes from second inductor $L_2$ to load elements 533 and 534. Inductor $L_3$ can be of a relatively small inductance and can be implemented in many cases by a simple length of wire. The length is empirically adjusted to minimize voltage spikes at node N6. The value of load capacitance $C_L$ (531) is selected empirically to filter out unwanted spikes. In one embodiment, a value of 40 $\mu$F was found to be an acceptable compromise for filtering out current spikes while maintaining low cost and small circuit size. Capacitor $C_{1b}$ separates the load ground node N10 from the source ground node N0 thereby providing a form of source to load isolation. Here again, the specific values for capacitors $C_{1a}$ and $C_{1b}$ is empirically determined according to the desired series capacitance of capacitors $C_{1a}$ and $C_{1b}$ and a desired impedance to be established at a given frequency between source ground node N0 and load ground node N10.

Note that the embodiment of FIG. 5 includes two forms of current limiting, a first of which is provided by comparator 525. The other is simultaneously provided when current sensor 524 is implemented as a resistor. The voltage drop across the resistor 524 then limits current on its own. As source current $I_{IN}$ increases, the voltage of the source terminal of MOSFET 521 increases relative to voltage at its gate terminal. If the current grows too large, the gate-to-source voltage drops below threshold and MOSFET 521 shuts off.

Although not shown, a further embellishment of circuit 500 adds an over-voltage monitoring means for monitoring the voltage at node N2 and comparing it against a predefined maximum value that is permitted across MOSFET 521. If the voltage at node N2 exceeds the predefined maximum value, circuit operation is halted to prevent damage to MOSFET 521. The unshown over-voltage monitoring means can be formed with a circuit similar to that of the current-sensing and control circuit formed by elements 523, 525 and 526. One input of the comparator of the unshown over-voltage monitoring means would connect to node N2 and the other to a reference level. An AND gate or other appropriate logic means would be interposed between flip flop 526 and drive amplifier 522 to allow the over-voltage monitoring means (not shown) to shut off MOSFET 521 in the case where excessive voltages begin to develop at node N2.

ALTERNATE CONTROL SCHEMES

The combination of unipolar input voltage $V_{IN}$, first inductor $L_1$, first switch $SW_1$ and switch control unit 322 (FIG. 3) can be modeled as a controllable current source with the control mechanism within unit 322 defining the type of current control that is to be obtained.

FIG. 5 shows one example of a current control scheme wherein the magnitudes of first and second currents $I_1$ and $I_2$ are regulated to oscillate within a control window that tracks input voltage $V_{IN}$. A generalization of this mode is graphed in FIG. 6A. The waveform of input voltage $V_{IN}$ is approximated by upper current bound 601 and lower current bound 602.

Figure 6A:
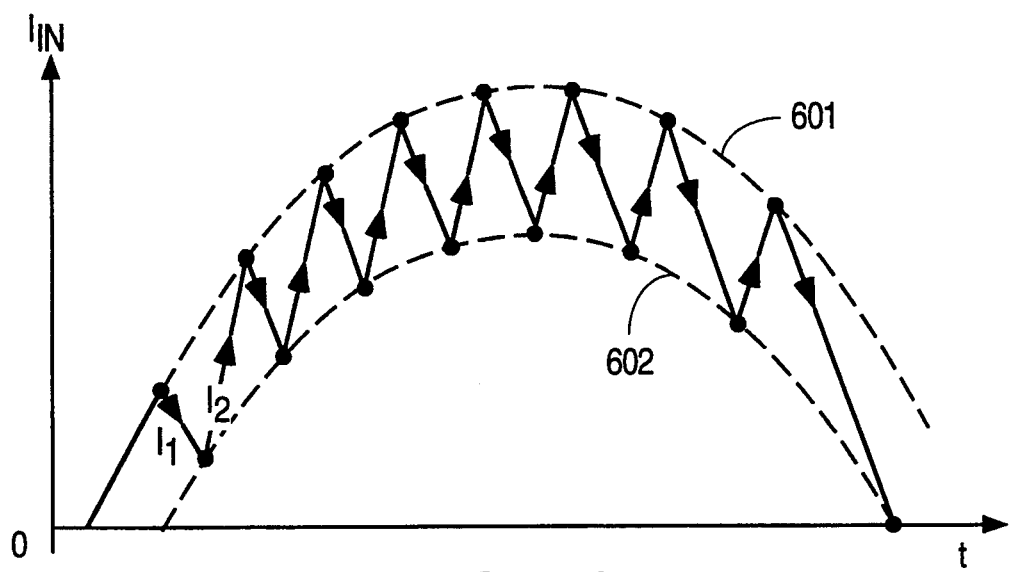
FIG. 6A is a current versus time graph showing a first current control method.
Figure 6B:
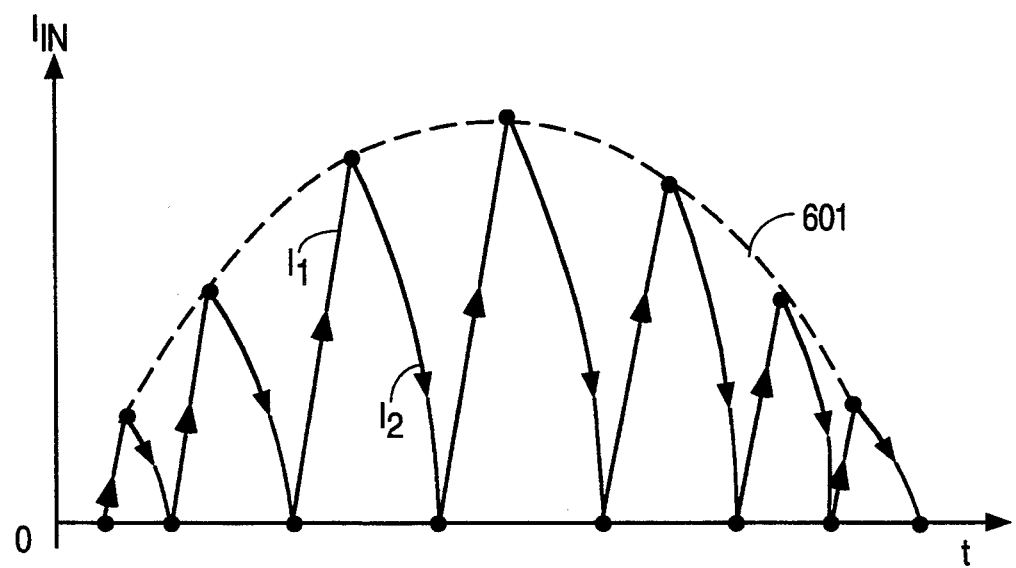
FIG. 6B is a current versus time graph showing a second current control method.

FIG. 6B illustrates another mode, which will be referred to as the quasi-resonant or return-to-zero mode. In this mode, second current $I_2$ is allowed to drop to zero before first switch $SW_1$ closes and first current $I_1$ builds to a desired maximum magnitude. Current sensing resistor 524 or an analog (e.g., a Hall effect device) is used to detect when second current $I_2$ has dropped to zero or close to zero. The advantage of this mode is that first switch $SW_1$ "soft switches" to its closed positioned at a zero power point. This reduces switching losses. First switch $SW_1$ still, however, "hard switches" to its open position at a nonzero power point. The waveform of input voltage $V_{IN}$ is approximated by upper current bound 603.

Figure 7A:
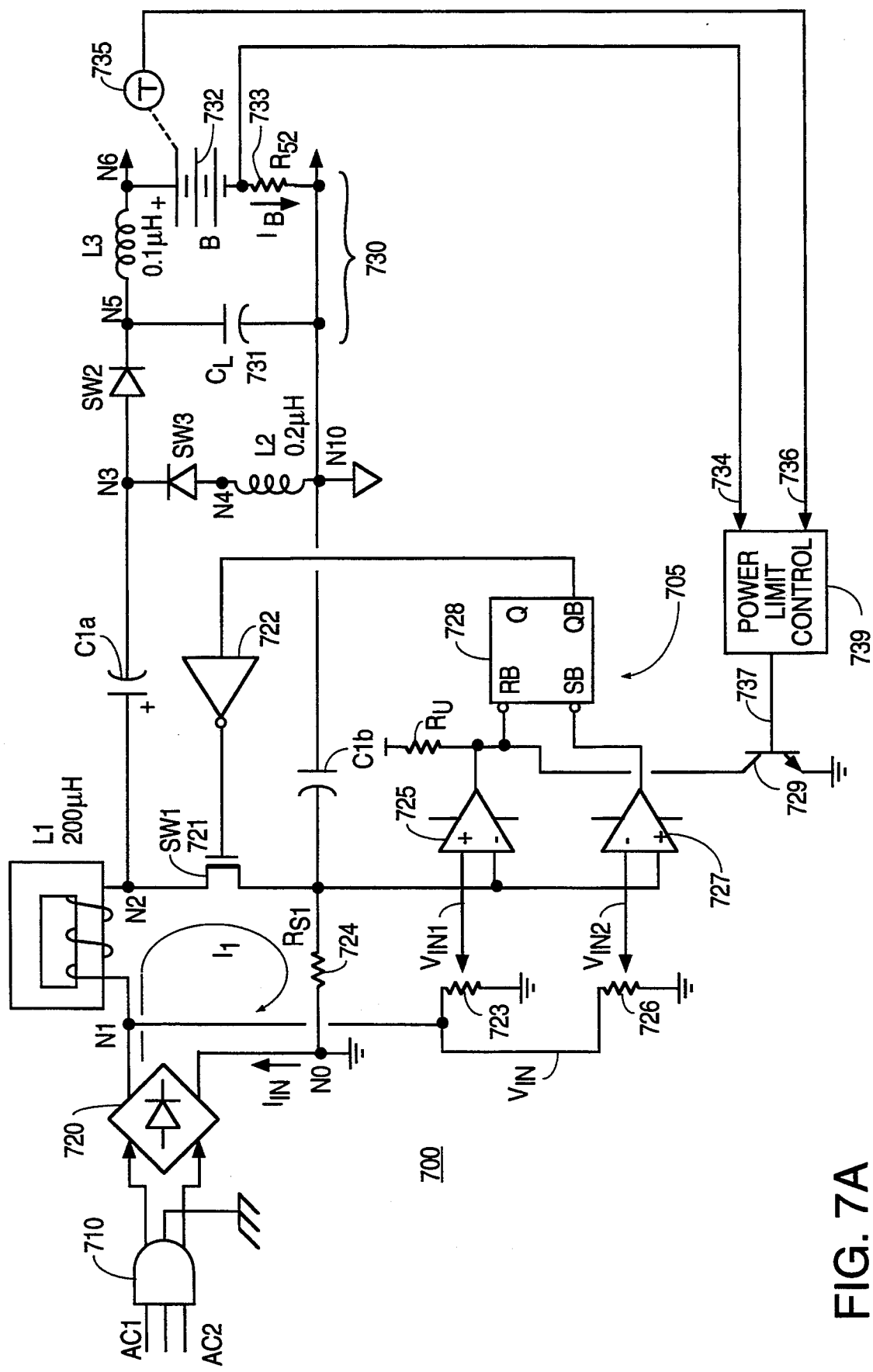
FIG. 7A is a schematic diagram of a third TT converter having a current control mechanism in accordance with the invention.

FIG. 7A is a schematic diagram of a TT converter circuit 700 which includes a current control means 705 for producing current bounding limits such as the ones 601, 602, and 603 shown in FIGS. 6A and 6B. Like reference symbols and numbers in the "700" series are utilized where practical in FIG. 7A for elements which have like-numbered counterparts numbered in the 300 series in FIG. 3 and numbered in the 500 series in FIG. 5.

In FIG. 7A, an AC outlet plug 710 supplies 120 VAC 60 Hz power to full-wave bridge rectifier 720. First inductor $L_1$ is a coil wound on a magnetic core to provide an effective inductance of 0.2 milliHenry (200 μH). Second inductor $L_2$ is a length of wire having an inductance of 0.2 μH. Third inductor $L_3$ is a length of wire having an inductance of approximately 0.1 μH. Capacitors $C_{1a}$ and $C_{1b}$ have a combined effective capacitance of 0.11 μF. Second switch $SW_2$ and third switch $SW_3$ are both Schottky diodes.

First switch $SW_1$ is formed of an N-channel power MOSFET 721 such as an International Rectifier IRFP250 ™. The source terminal of MOSFET 721 connects to the source ground node N0 by way of sense resistor 724. First sense resistor 724 ($RS_1$) is a temperature compensated (TC) current sensor having a resistance of 0.5 Ω (half an ohm). The drain of MOSFET 721 connects to N2. The gate of MOSFET 721 is driven by an inverting output of a gate drive amplifier 722. Gate drive amplifier 722 can be a Teledyne TC4421 ™ or the like.

Resistor 724 functions as a current limiter for MOSFET 721. The source voltage of MOSFET 721 increases relative to source ground node N0 as first current $I_1$ increases. If the voltage across resistor 724 reaches or exceeds the gate voltage of MOSFET 721, MOSFET 721 turns off.

Resistor 724 also operates as a current measuring means for measuring the magnitude of source current $I_{IN}$. The end of current sense resistor 724 which connects to the source of MOSFET 721 also connects to the negative (−) input terminal of a first comparator 725 and to the positive (+) input terminal of a second comparator 727. If source current $I_{IN}$ produces a drop across current sense resistor 724 which exceeds a scaled first voltage $V_{IN1}$ on the positive (+) input terminal of a first comparator 725, the first comparator 725 outputs a logic low ("0"). (First comparator 725 has an open collector output which is pulled high by pull-up resistor $R_U$.) If source current $I_{IN}$ produces a drop across current sense resistor 724 which is less than or equal to a scaled second voltage $V_{IN2}$ on the negative (−) input terminal of second comparator 727, the second comparator 727 outputs a logic low ("0").

A user-adjustable first potentiometer 723 is provided between node N1 and source ground node N0 for developing the scaled first voltage $V_{IN1}$ so that the scaled first voltage $V_{IN1}$ represents a scaled replica of input voltage $V_{IN}$. A user-adjustable second potentiometer 726 is additionally provided between node N1 and source ground node N0 for developing the scaled second voltage $V_{IN2}$ such that the scaled second voltage $V_{IN2}$ represents another scaled replica of input voltage $V_{IN}$. The wiper of first potentiometer 723 connects to the positive (+) input terminal of first comparator 725. The wiper of second potentiometer 726 connects to the negative (−) input terminal of second comparator 727. Note that there is no oscillator such as 550 of FIG. 5.

A set/reset (S/R) flip flop 728 is provided with its inverted output (QB or "Q-bar") connected to the input of the inverting gate drive amplifier 722. When the QB output of flip flop 728 is at logic low ("0"), gate drive amplifier 722 outputs a gate voltage level for turning the first switch $SW_1$ (MOSFET 721) on. When the QB output of flip flop 728 is at logic high ("1"), gate drive amplifier 722 outputs a gate voltage level for turning MOSFET 721 off.

The open-collector output of first comparator 725 drives the reset-bar (RB) input of flip flop 728. The output of second comparator 727 drives the set-bar (SB) input of flip flop 728. A power-limiting NPN transistor 729 is further provided with its collector tied to the reset-bar (RB) input of flip flop 728 and its emitter connected to the source ground node N0. When a logic high ("1") voltage is applied to the base of the power-limiting NPN transistor 729, transistor 729 becomes conductive and pulls the reset-bar (RB) input of flip flop 728 to ground, thereby resetting flip flop 728.

Assume that the power-limiting NPN transistor 729 is turned off. First switch $SW_1$ turns on to increase the first current $I_1$ when the voltage drop across current sense resistor 724 is less than or equal to the scaled second voltage $V_{IN2}$. First switch $SW_1$ turns off to discharge part or all of the built-up first current $I_1$ as second current $I_2$ when the voltage drop across current sense resistor 724 exceeds the scaled first voltage $V_{IN1}$.

With appropriate settings of the first and second potentiometers, 723 and 726, the TT converter circuit 700 can be made to follow the current control profile of either FIG. 6A or FIG. 6B. To obtain the quasi-resonant profile of FIG. 6B, the wiper of second potentiometer 726 is adjusted to produce a scaled second voltage $V_{IN2}$ that is at or close to ground.

The load 730 of FIG. 7A can include any one or more of load capacitance $C_L$ (731), battery B (732) and second current-sensing resistor 733. Note that resistor 733 is placed in series with battery B to sense and/or limit the current $I_B$ that flows into battery B.

When second current-sensor (resistor) 733 is present, a current-control feedback connection 734 can be provided as shown from the second current-sensor (resistor) 733 to a power-limit control unit 739. The power-limit control unit 739 turns power-limiting transistor 729 on when an operational limit of chargeable battery 732 has been exceeded. One such limit could be that the magnitude of battery current $I_B$ has exceeded a prespecified first limit. Another alternate or concurrent such limit could be that the integral over time of battery current $I_B$ has exceeded a prespecified second limit. Yet another alternate or concurrent such limit could be that the temperature of chargeable battery 732 has exceeded a prespecified third limit. To this last end, a temperature sensor (e.g., thermistor) 735 is provided, thermally coupled to the chargeable battery 732, and electrically coupled to power-limit control unit 739 by way of current-control feedback connection 736.

When power-limiting transistor 729 is turned on, it forces first switch $SW_1$ (721) to open, first and second currents $I_1$ and $I_2$ decay to zero, capacitors $C_{1a}$ and $C_{1b}$ charge to a shut-off value, and power transfer from the power source 710 to the load 730 stops. Circuit 700 remains in this no-transfer state until the power-limit control unit 739 turns power-limiting transistor 729 off.

It is to be understood that other loading devices can be connected to the output nodes N5 and N10 of the embodiment shown in FIG. 7A. By way of example, the TT converter circuit 700 of FIG. 7A can serve as the front end of an uninterruptable power system (UPS). In such a case, battery B (732) regulates the load voltage $V_L$ and stores back-up power that is to be used in the event of a disruption of power flow from the primary supply 710. Note that TT converter circuit 700 can continue to extract power from the outlet plug 710 even when so-called "brown-outs" occur, where the primary supply voltage $V_{IN}$ drops below its normal magnitude.

Other applications for the TT converter circuits disclosed here include, but are not limited to: extracting power from wind/wave machines, extracting power from photovoltaic devices, powering portable computers or other portable equipment, charging the batteries of electric vehicles (electric cars) and powering airborne equipment.

EXPERIMENTAL RESULTS

Referring to FIGS. 7B through 7I, in one set of experiments, the circuit of FIG. 7A was modified to include a variac (not shown) between the 120 VAC utility supply 710 and the full-wave bridge rectifier 720. Input voltage $V_{IN}$ was adjusted to approximately 80 V peak. A 9 V rechargeable NiCd battery was used as load 732. Capacitor C1b was shorted out of the circuit. A multitrace oscilloscope was connected with its ground lead at load ground node N10 to simultaneously display voltages at nodes N1, N2 and currents through sense resistors $RS_1$ (724) and $RS_2$ (733).

Circuit 700 was operated in a free-running mode for the oscilloscope traces shown FIGS. 7B–7E and in quasiresonant mode for FIGS. 7F–7I.

All oscilloscope traces (FIGS. 7B–7I) have a horizontal setting of 5 milliseconds per division. FIGS. 7B–7E are time aligned one above the next and FIGS. 7F–7i are similarly time aligned one above the next. A vertical scale of 2 amperes per division is used in FIGS. 7B, 7C, 7F and 7G. A vertical scale of 50 volts per division is used in FIGS. 7D and 7H. A vertical scale of 20 volts per division is used in FIGS. 7E and 7I.

Figure 7B:
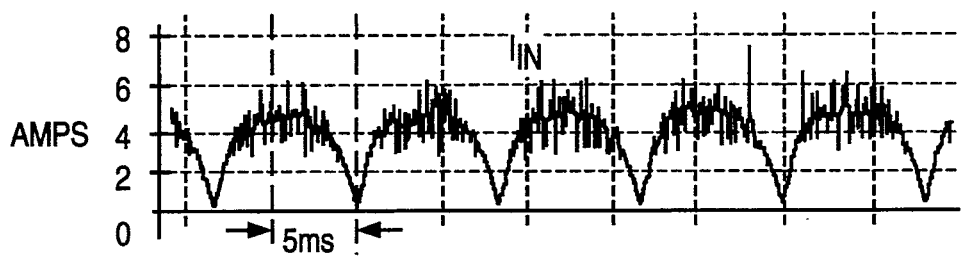
FIG. 7B is a current versus time graph showing test results for $I_{IN}$ obtained with the TT converter of FIG. 7A operating in a free running mode.
Figure 7C:
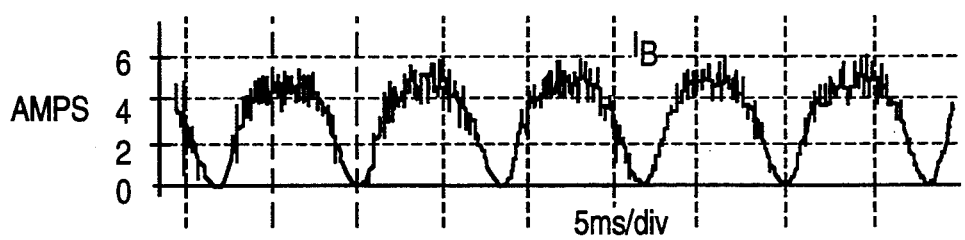
FIG. 7C is a current versus time graph showing test results for $I_B$ obtained with the TT converter of FIG. 7A operating in a free running mode.
Figure 7D:
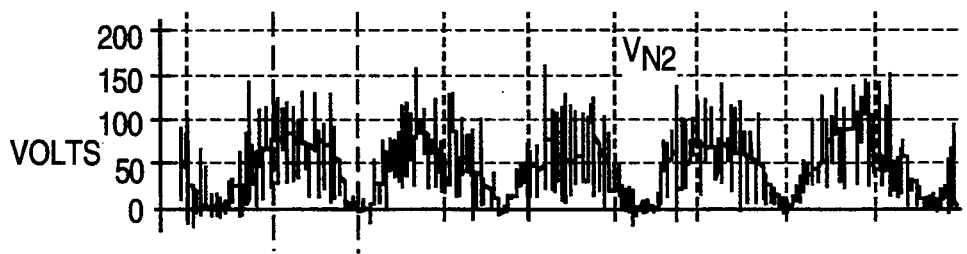
FIG. 7D is a voltage versus time graph showing test results obtained for $V_{N2}$ with a TT converter such as shown in FIG. 7A operating in a free running mode.
Figure 7E:
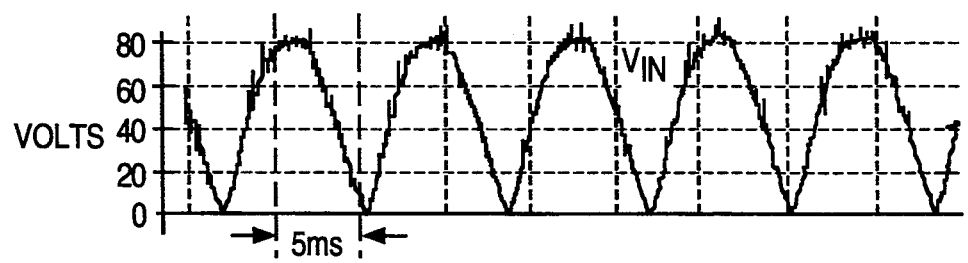
FIG. 7E is a voltage versus time graph showing test results obtained for $V_{IN}$ with a TT converter such as shown in FIG. 7A operating in a free running mode.

As seen in FIG. 7E, the voltage at node N1 appears as a full-wave rectified, almost-sinusoidal waveform having a peak value of approximately 80 V and a minimum value just above zero. As seen in FIG. 7D, the voltage at node N2 has a roughly similar, almost-sinusoidal envelope but a higher a peak value going as high as approximately 150 V and a minimum value oscillating about approximately 10 v. The average DC voltage sustained across first capacitor $C_1$ (C1a) is approximately 50 V. The voltage at node N3 was found to be approximately 10 VDC (not shown) with periodic dips to 9 V occurring simultaneously with the minimum points of battery current $I_B$ (FIG. 7C). These dips in the $V_{N3}$ waveform (not shown) are due to periodic stoppages of the approximately one volt forward drop across the SW2 diode as battery current $I_B$ drops to zero.

The combination of FIGS. 7B and 7E shows that source current $I_{IN}$ generally tracks input voltage $V_{IN}$, thus providing a favorable power factor.

Figure 7F:
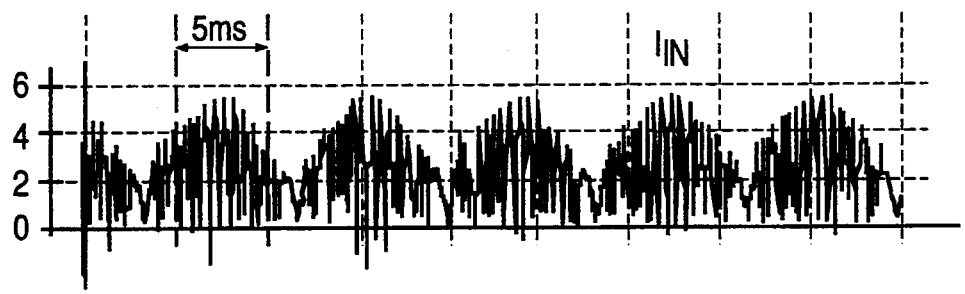
FIG. 7F is a current versus time graph showing test results for $I_{IN}$ obtained with the TT converter of FIG. 7A operating in a quasi-resonant mode.
Figure 7G:
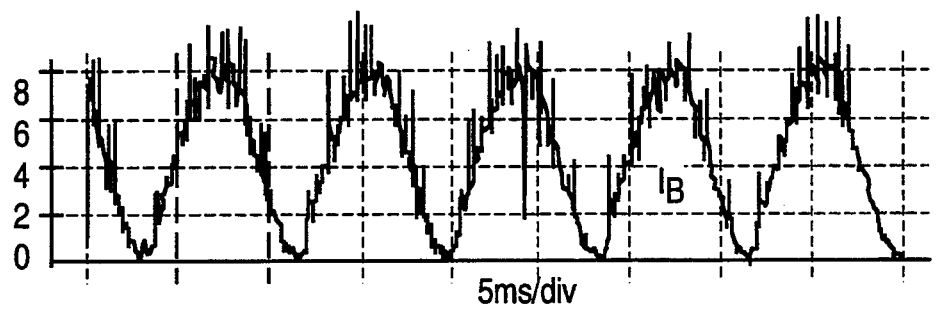
FIG. 7G is a current versus time graph showing test results for $I_B$ obtained with the TT converter of FIG. 7A operating in a quasi-resonant mode.
Figure 7H:
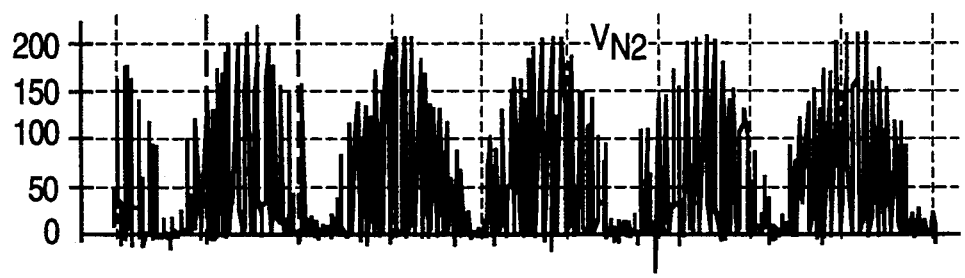
FIG. 7H is a voltage versus time graph showing test results obtained for $V_{N2}$ with a TT converter such as shown in FIG. 7A operating in a quasi-resonant mode.
Figure 7I:
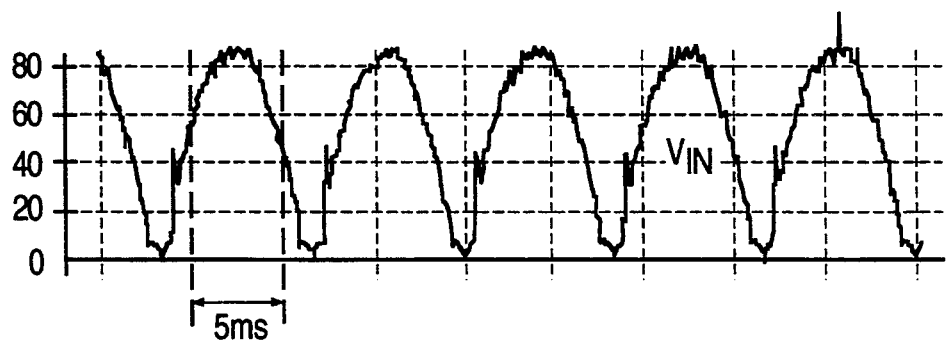
FIG. 7I is a voltage versus time graph showing test results obtained for $V_{IN}$ with a TT converter such as shown in FIG. 7A operating in a quasi-resonant mode.

For FIGS. 7F through 7I, the wiper of second potentiometer 726 was brought down to ground, thereby providing quasi-resonant operation. As seen in FIG. 7F, source current $I_{IN}$ returns to zero numerous times during each pulse of input voltage $V_{IN}$ (FIG. 7I). The upper envelope of the $I_{IN}$ waveform, however, continues to track the full-wave rectified envelope of input voltage $V_{IN}$, thereby providing a power factor, which although not as favorable as that seen in FIGS. 7B and 7E, is still relatively good. An advantage of quasi-resonant mode is that first switch $SW_1$ now soft switches at a zero power point every time it closes to raise first current $I_1$ from zero to the envelope peak.

FURTHER EMBODIMENTS

Figure 8:
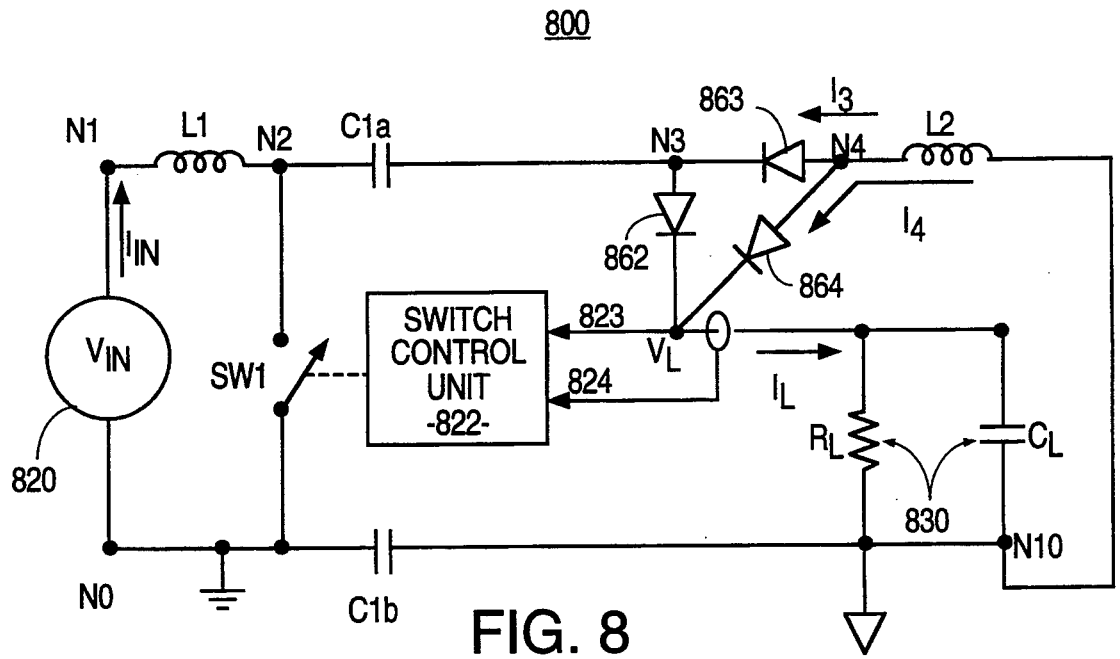
FIG. 8 is a schematic diagram of a fourth TT converter having an output power form control mechanism in accordance with the invention.

FIG. 8 shows another TT converter circuit 800 having an output power-form control mechanism. In TT converter 800, a switch control unit 822 is provided with one or both of a voltage sensing means 823 for sensing load voltage $V_L$ and a current sensing means 824 for sensing load current $I_L$. Control unit 822 operates first switch $SW_1$ to obtain a desired voltage and/or current at the load 830. Load 830, which includes one or both of resistance $R_L$ and capacitance $C_L$, does not have to be self-regulating in this instance.

While not shown, it is to be understood that control unit 822 can be modified to receive source parameters $V_{IN}$ and $I_{IN}$ as further control inputs. In such a case, a complex control relationship can be established between the input power form, $Px_{IN}=I_{IN}(t) \cdot V_{IN}(t)$ and the load power form, $Px_L=I_L(t) \cdot V_L(t)$ as deemed appropriate for the specific working load 830 and power source 820.

Note that three diodes 862–864 are provided in TT-converter 800 for performing the function of the earlier described switches SW2 and SW3. Diode 864 carries fourth current $I_4$ directly to the load 830, thereby bypassing the drop across diode 862. Diode 863 carries third current $I_3$. This embodiment has more parts but less loss in diodes 862 and 864 because each carries less current and thus has a smaller forward bias, voltage drop.

Figure 9:
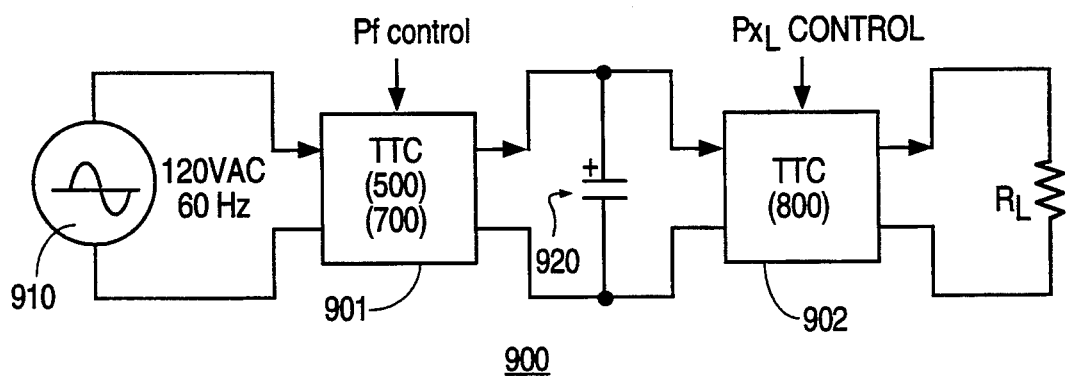
FIG. 9 is a block diagram showing a plurality of TT converters cascaded in series.

FIG. 9 is a block diagram showing two TT converter circuits, 901 and 902, cascaded in series.

Assume the first TT converter circuit 901 is the same as either the TT converter circuit 500 shown in FIG. 5 or the TT converter circuit 700 shown in FIG. 7A. A full-wave bridge rectifier (not shown) is included in the first TT converter circuit 901 for converting the 120 VAC 60 Hz input 910 to a unipolar input voltage $V_{IN}$.

Assume further that the second TT converter circuit 902 is the same as the TT converter circuit 800 shown in FIG. 8. The load for the first TT converter circuit 901 comprises capacitor 920 and second TT converter circuit 902. Capacitor 920 also serves as the unipolar voltage source for second TT converter circuit 902. The load for the second TT converter circuit 902 is a non-self-regulating resistance $R_L$.

The first TT converter circuit 901 is operated to maintain a desired power factor at its input. The second TT converter circuit 902 is operated to maintain a desired power form at its output. The voltage across capacitor 920 is free to float to a level that is mutually beneficial to the control needs of both TT converter circuits, 901 and 902. If desired, a chargeable battery (not shown) can be connected in parallel to capacitor 920 to self-regulate the voltage developed across capacitor 920.

SOURCE TO LOAD ISOLATION

A first type of source to load isolation is provided in the series-cascaded TT-converters circuit 900 of FIG. 9 when the split capacitors $C_{1a}$ and $C_{1b}$ of FIGS. 5 or 7A and 8 are used for respective TT converter circuits 901 and 902. The series connected string of capacitors between the source ground and the load ground can operate as a low pass filter. With appropriate selection of values for split capacitors $C_{1a}$ and $C_{1b}$ in each of TT converter circuits 901 and 902, a relatively large impedance at 60 Hz can be established between the source ground and the load ground as a result of the series connected capacitors interposed between these ground nodes. (The Underwriters Laboratory establishes various isolation requirements for consumer goods. An example would be a requirement for a minimum impedance of 100 KΩ at 60 Hz between the source and load ground points.)

Figure 10A:
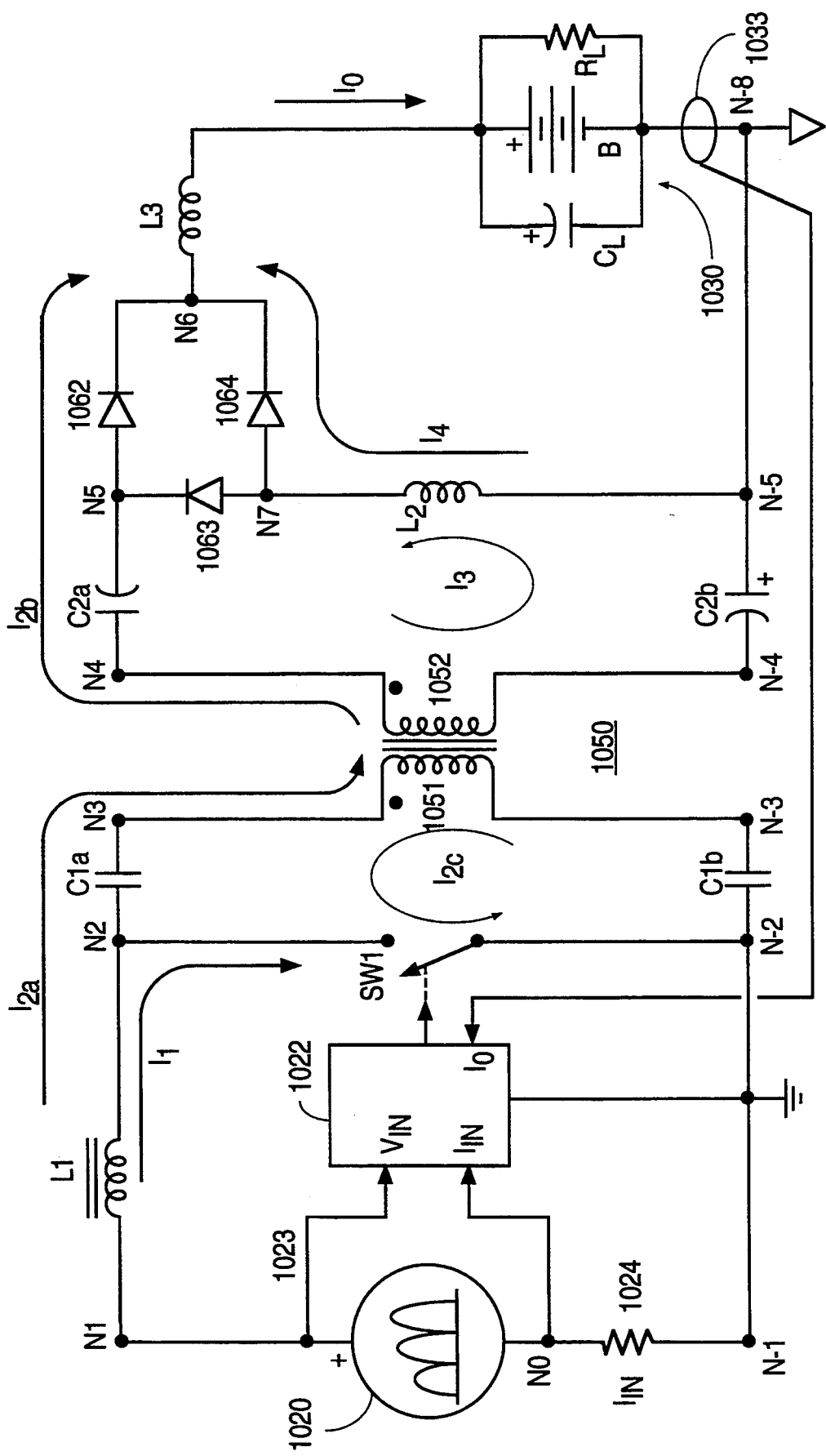
FIG. 10A is a schematic diagram of a fifth TT converter having an input/output isolation mechanism in accordance with the invention.

For some applications (e.g. medical instrumentation) it is desirable to provide a better form of isolation between the power source and working load. FIG. 10A illustrates another TT converter circuit 1000 which includes an isolation transformer 1050 interposed between the unipolar power source 1020 and load 1030.

Like reference symbols and numbers in the "1000" series are utilized where practical in FIG. 10A for elements which have like-symbolized or like-numbered counterparts in previously described FIGS. 3, 5, 7A and 8. Switch control circuit 1022 opens and closes first switch SW$_1$ so as to establish a desired magnitude range for first current I$_1$. If desired, the switch control circuit 1022 can include voltage detecting means 1023 for measuring the magnitude of input voltage V$_{IN}$ and current detecting means 1024 for measuring the magnitude of source current I$_{IN}$ and power factor correction means (not shown) for causing source current I$_{IN}$ to substantially track input voltage V$_{IN}$ over time.

As before, first current I$_1$ increases in magnitude while first switch SW$_1$ remains closed. When first switch SW$_1$ opens, a primary loop current I$_{2a}$ flows through the circuit loop formed by unipolar power source 1020, first inductor L$_1$, capacitor C$_{1a}$, the primary side 1051 of transformer 1050, capacitor C$_{1b}$ and current sensor 1024. When first switch SW$_1$ next closes, a primary return current I$_{2c}$ flows in a direction opposing that of primary loop current I$_{2a}$. The primary return current I$_{2c}$ flows through the circuit loop formed by the closed first switch SW$_1$, capacitor C$_{1a}$, primary side 1051 and capacitor C$_{1b}$.

A secondary loop current I$_{2b}$ develops in the secondary side 1052 of transformer 1050 in accordance with the illustrated dot convention when current I$_{2a}$ flows through the primary side 1051. The secondary loop current I$_{2b}$ flows through a circuit loop formed by capacitor C$_{2a}$, diode 1062, load 1030 and capacitor C$_{2b}$. Capacitors C$_{2a}$ and C$_{2b}$ absorb the voltage difference between the voltage V$_{4,-4}$ developed across the secondary side 1052 of transformer 1050 and the load voltage V$_L$ developed across load 1030. (Note that the nodes are numbered somewhat differently in FIG. 10A. Node N-1 is drawn below and opposite of node N1. Nodes N3 and N-3 define opposed ends of transformer primary side 1051. Nodes N4 and N-4 define opposed ends of transformer secondary side 1052. Load 1030 is positioned between nodes N8 and N-8. A current-smoothing inductor L$_3$ is provided between nodes N6 and N8 for smoothing out (filtering) spikes in output load current I$_O$. The excess energy returning inductor L$_2$ is positioned between nodes N7 and N-5.) The winding ratio of transformer 1050 can be one-to-one or any other desired ratio. Circuit parameters are chosen such that the voltage V$_{4,-4}$ developed across the secondary side 1052 exceeds the load voltage V$_L$ required by the load 1030.

Load 1030 can include one or more of a load capacitance C$_L$, rechargeable battery B and load resistance R$_L$. An isolated current sensor 1033 such as a Hall-effect device can be used to monitor the output load current I$_O$ and feedback the measured value to switch control circuit 1022. If desired, switch control circuit 1022 can vary the openings and closings of first switch SW$_1$ to provide a desired magnitude or waveform for output load current I$_O$.

Figure 10B:
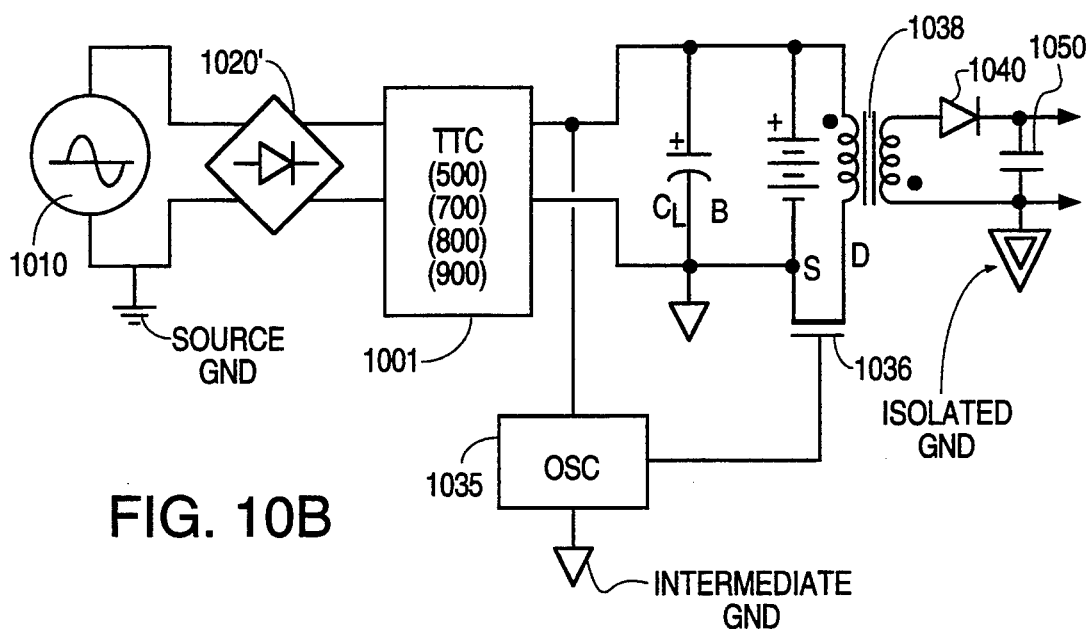
FIG. 10B shows another method for providing input/output isolation.

FIG. 10B shows an alternative method for realizing source to load isolation. AC power source 1010 and full-wave bridge rectifier 1020' form a unipolar voltage source that supplies power to TT converter circuit 1001. The TT converter circuit 1001 can be implemented in accordance with any of TT converter circuits 300, 500, 700, 800 or 900 shown respectively in FIGS. 3, 5, 7A, 8 and 9. The output load of TT converter circuit 1001 includes a load capacitance C$_L$, chargeable battery B, oscillator 1035, power MOSFET 1036 and isolation flyback transformer 1038. Oscillator 1035 switches MOSFET 1036 rapidly on and off to create a switched current in the primary of transformer 1036. Battery B and/or load capacitance C$_L$ supply power to the oscillator 1035 and primary side of isolation transformer 1038. A diode 1040 and low pass filter 1050 are provided at the secondary side of transformer 1038 for producing an isolated DC voltage.

Although FIG. 10B shows a flyback technique for producing an isolated DC voltage from the voltage produced across load capacitance C$_L$ and/or battery B, it is to be understood that other DC to DC isolation techniques can also be used. The flyback operation is merely an example of how DC to DC isolation can be realized in conjunction with the TT converter circuit. The double-triangle symbol represents the isolated load ground. A single-triangle symbol is used to represent an intermediate ground point before the isolation transformer 1038.

CURRENT MERGING AND SPLITTING

Figure 11A:
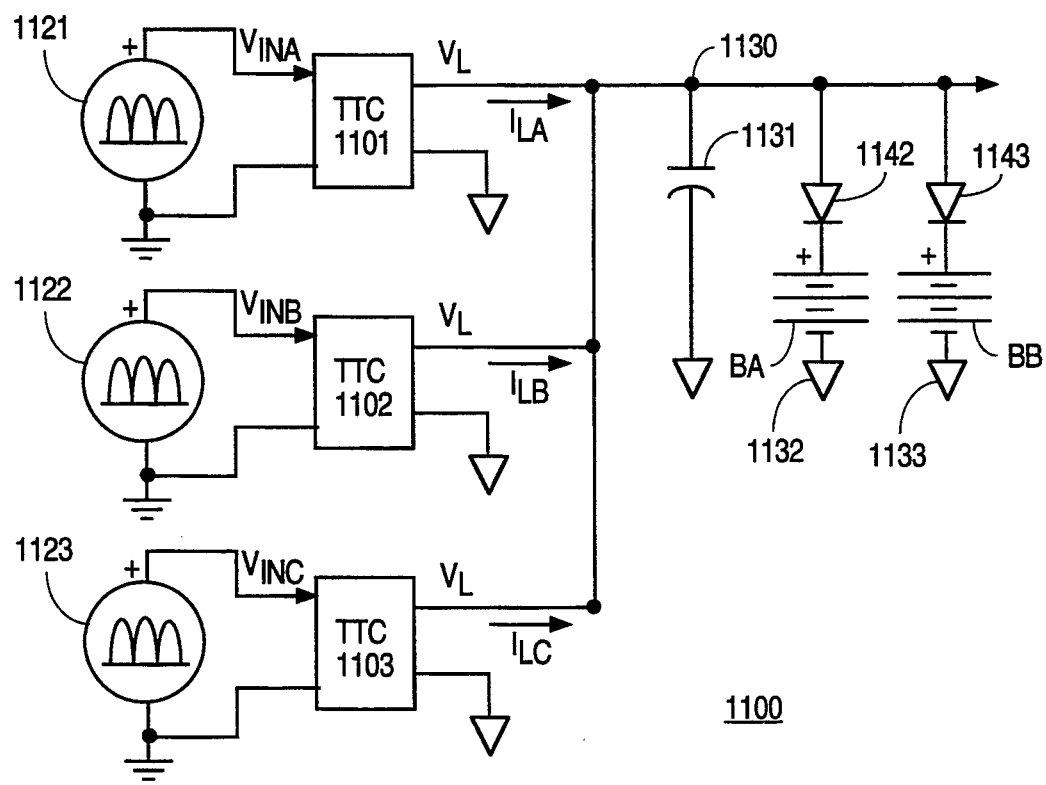
FIG. 11A is a block diagram of a current merging embodiment of the invention.

Referring to FIG. 11A, note that a TT converter circuit, when stripped of its load capacitance C$_L$ and/or battery B, can be viewed as a voltage to current converter with flexibility to handle different input or output voltages. FIG. 11A shows a combination 1100 of three TT converter circuits, 1101, 1102 and 1103 respectively powered by unipolar voltage sources 1121, 1122 and 1123. The respective input voltages, V$_{INA}$, V$_{INB}$, and V$_{INC}$, of unipolar voltage sources 1121, 1122 and 1123 can be different or the same. The voltage sources share a common source ground. In the case where input voltages, V$_{INA}$, V$_{INB}$, and V$_{INC}$ are the same, unipolar voltage sources 1121, 1122 and 1123 can be merged into a single voltage source.

The outputs of TT converter circuits, 1101, 1102 and 1103 are connected together at a current summing node 1130. Node 1130 transfers the received currents to a load comprised of load capacitance 1131, battery BA (1132) and battery BB (1133). Diode 1142 is interposed between the battery 1132 and node 1130. Diode 1143 is similarly interposed between the battery 1133 and node 1130.

The respective output currents, I$_{LA}$, I$_{LB}$, and I$_{LC}$, of TT converter circuits 1101, 1102 and 1103 merge at the current summing node 1130 to supply a combined charge flow to whichever one or more of loads 1131, 1132 and 1133 has the lowest voltage. The load output voltage V$_L$ of TT converter circuits 1101, 1102 and 1103 is established by the load with the lowest voltage. If all load voltages are the same, charge current flows in balanced fashion to the plural loads. If one of batteries 1132 and 1133 has a higher voltage than the other, the diode 1142 or 1143 of the more highly charged battery becomes reverse biased.

Figure 11B:
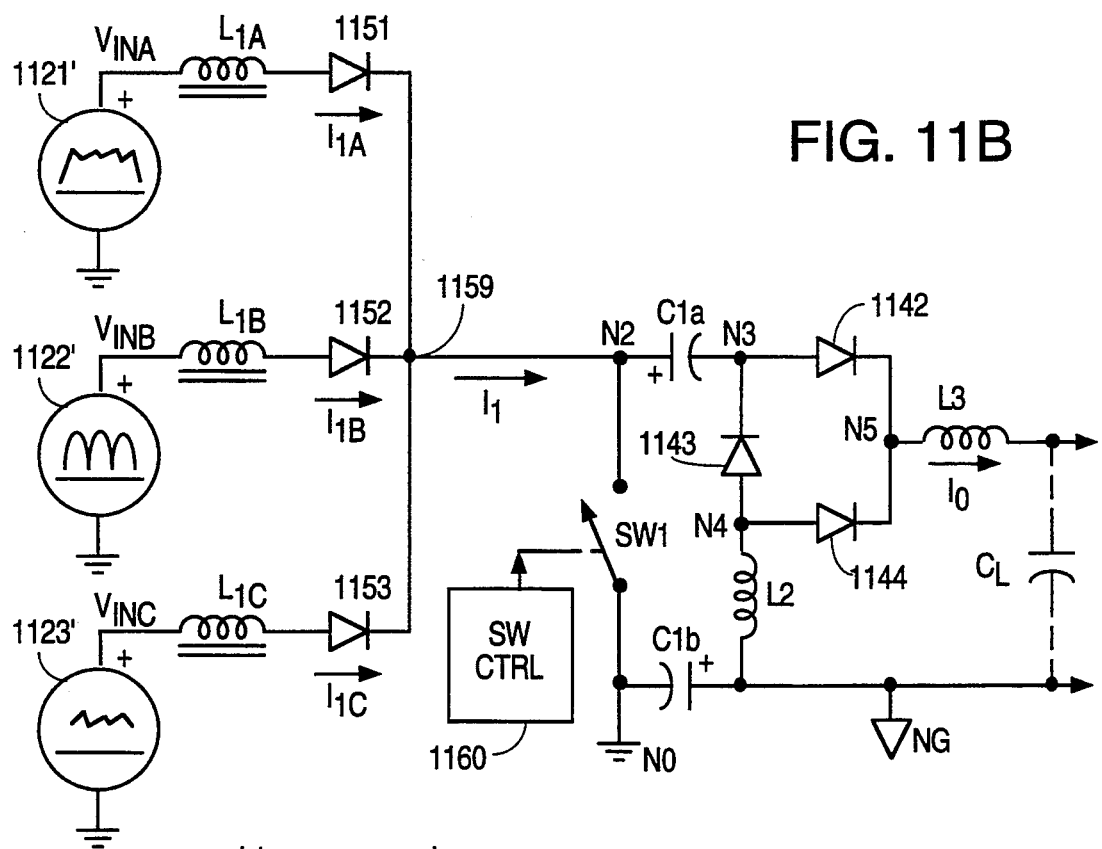
FIG. 11B is a schematic diagram of another current merging embodiment of the invention.

FIG. 11B shows another variation 1105 on the same theme except that a single first switch SW$_1$ and a single control unit 1160 are used to draw power from one or more of unipolar voltage sources 1121', 1122' and 1123' where the voltage sources have respective voltages, $V_{INA}$, $V_{INB}$, and $V_{INC}$. Note that different waveforms are shown in the symbols for unipolar voltage sources 1121', 1122' and 1123' to indicate that they do not have to be the same. Some may be discontinuous sources of power while others (e.g., a battery) provide continuous power. In the case where input voltages, $V_{INA}$, $V_{INB}$, and $V_{INC}$ are the same, unipolar voltage sources 1121', 1122' and 1123' can be merged into a single voltage source.

In FIG. 11B, each of unipolar voltage sources 1121', 1122' and 1123' is connected in series to a respective one of first inductors $L_{1A}$, $L_{1B}$, $L_{1C}$, and respective diodes 1151, 1152, 1153. The respective first currents $I_{1A}$, $I_{1B}$, $I_{1C}$, that flow through first inductors $L_{1A}$, $L_{1B}$, $L_{1C}$, and diodes 1151, 1152, 1153 merge at current summing node 1159 (N2) to produce a combined first current $I_1$. Control unit 1160 opens and closes first switch $SW_1$ in accordance with one or more of the control schemes discussed above to provide either a desired power factor for one or more of the unipolar voltage sources 1121', 1122' and 1123' and/or to provide a desired output voltage at output node N6 and/or a desired output current $I_O$ flowing through third inductor $L_3$. The connection of capacitance $C_L$ is optional as will become apparent from the below discussion of FIG. 14. Also, capacitor $C_{1b}$ is optionally interposed between the source ground node N0 and the output ground node NG to provide isolation. One of the above described other isolation techniques can, of course, also be used. If desired, some form of inductive coupling (not shown) may be provided between any one or more of inductors $L_{1A}$, $L_{1B}$, $L_{1C}$, $L_2$ and $L_3$ to provide various control/feedback effects.

Figure 12C:
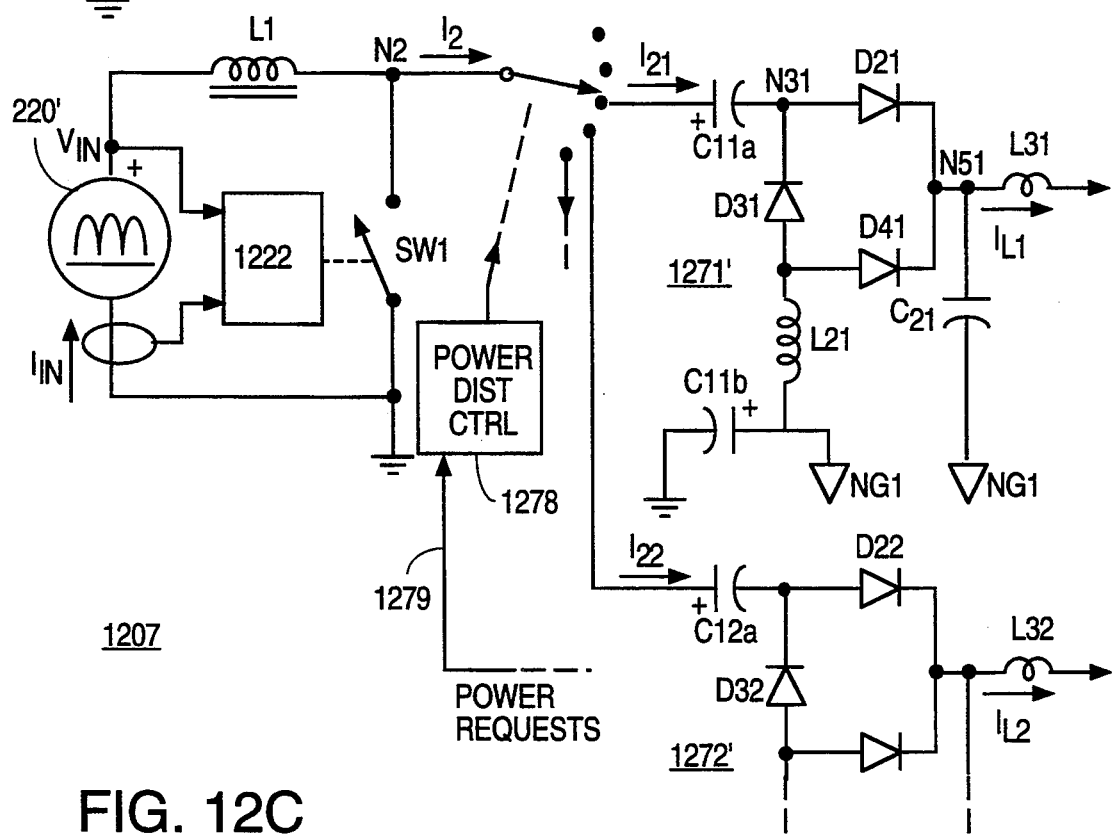
FIG. 12C shows a time-multiplexed, source power splitting embodiment of the invention.
Figure 12A:
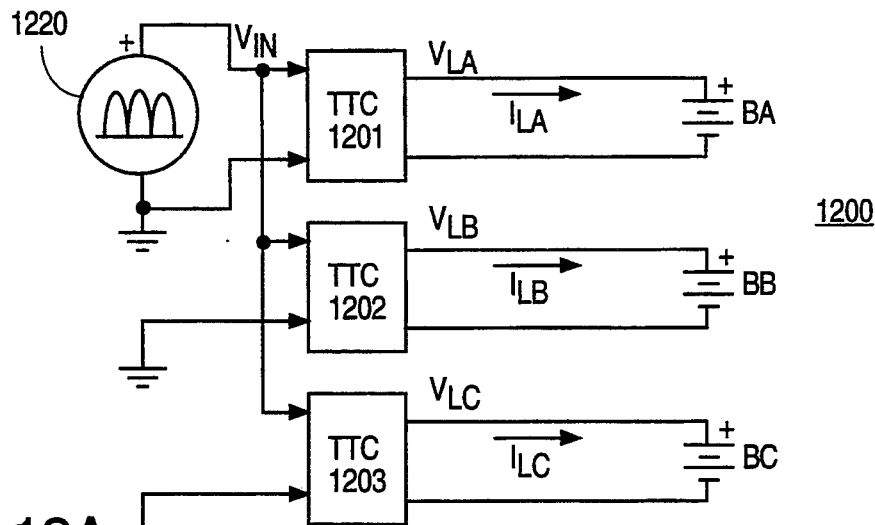
FIG. 12A is a block diagram of a source power splitting embodiment of the invention.

FIG. 12A shows yet another arrangement 1200 in which three TT converter circuits 1201, 1202 and 1203 develop three different or same load voltages $V_{LA}$, $V_{LB}$, $V_{LC}$, from a single unipolar voltage source 1220.

Figure 12B:
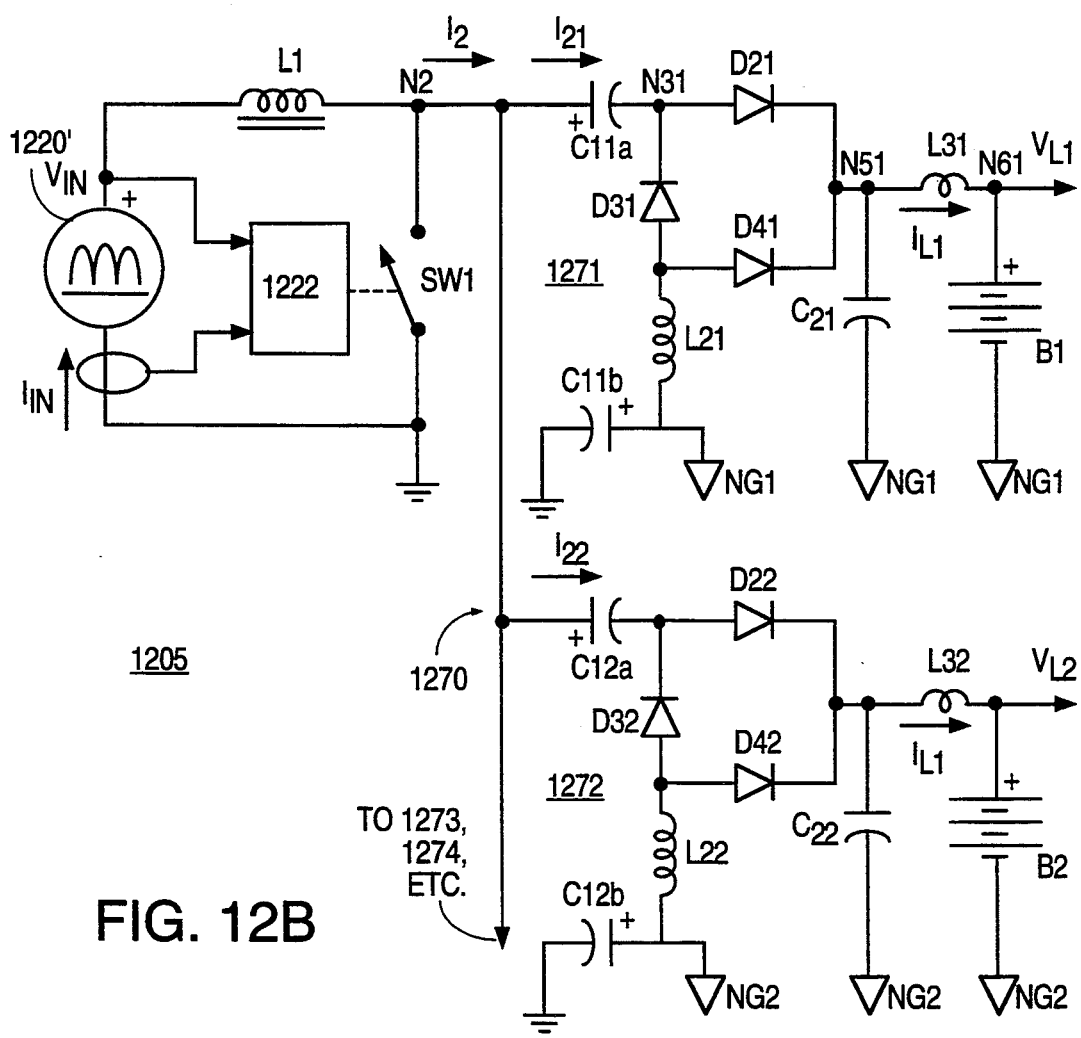
FIG. 12B is a schematic diagram of another source power splitting embodiment of the invention.

One disadvantage of the arrangement 1200 of FIG. 12A is that each of TT converter circuits 1201, 1202 and 1203 has its own, relatively bulky first inductor $L_1$ (not shown). FIG. 12B shows an alternate embodiment 1205 in which the first inductor $L_1$ is shared.

As seen in FIG. 12B, first switch $SW_1$ is opened and closed by control unit 1222 to generate second current $I_2$ discharging through node N2 from first inductor $L_1$. If desired, control unit 1222 can include a power factor correction means (not shown) that detects the magnitude of input voltage $V_{IN}$ of power source 1220' and detects the magnitude of source current $I_{IN}$ and controls the opening and closings of first switch $SW_1$ so that source current $I_{IN}$ substantially tracks increases and decreases of input voltage $V_{IN}$.

Second current $I_2$ is divided by a current splitting line 1270 into second current subcomponents $I_{21}$, $I_{22}$, etc. Second current subcomponent $I_{21}$ enters a first power converting subsection 1271. Second current subcomponent $I_{22}$ enters a second power converting subsection 1272. If desired, current splitting line 1270 can extend to similar, additional power converting subsections, 1273, 1274, etc. (not shown).

Each power converting subsection 1271, 1272, etc. converts the respective power form that it receives, $V_{N2} \cdot I_{21}$, $V_{N2} \cdot I_{22}$, etc. into a corresponding power form $V_{L1} \cdot I_{L1}$, $V_{L2} \cdot I_{L2}$, etc that is to be delivered to its respective load, B1, B2, etc. It is to be understood that the load of each power converting subsection 1271, 1272, etc. is not restricted to being a chargeable battery. Each battery B1, B2, etc. can be replaced by or connected in parallel to other loading devices. The other loading devices can include but are not limited to additional batteries, other electro-chemical work loads, resistive and/or capacitive work loads, and further TT converter circuits. It is also to be understood that the voltage $V_{N2}$ developed at node N2 of embodiment 1205 is greater than the largest one of the respective load voltages $V_{L1}$, $V_{L2}$, etc. of the power converting subsections 1271, 1272, etc. that are to receive power from power source 1220'.

Referring to first power converting subsection 1271, capacitors $C_{11a}$ and $C_{11b}$ provide DC and low frequency isolation between the power source 1220' and load connection nodes, N61 and NG1. Capacitors $C_{11a}$ and $C_{11b}$ also store the excess voltage that develops between nodes N2 and N51. (The excess voltage is approximately $V_{N2} - V_{L1}$.) Diode D21 directs the second current subcomponent $I_{21}$ to the load (to $C_{21}$, $L_{31}$ and B1). Diode D31 directs the discharge current ($I_3$) of capacitors $C_{11a}$ and $C_{11b}$ through inductor $L_{21}$. Diode D41 directs the discharge current ($I_4$) of inductor $L_{21}$ to the load (to $C_{21}$, $L_{31}$ and B1). Capacitor $C_{21}$ and inductor $L_{31}$ form a low-pass filter for smoothing out the spikes created by inductive discharge currents $I_2$ and $I_4$. Battery B1 self-adjusts the voltage $V_{L1}$ developed between load nodes N61 and NG1. If desired, other means can be used to regulate the voltage $V_{L1}$ that develops between load nodes N61 and NG1.

Second power converting subsection 1272 is similarly formed of excess-voltage storing capacitors $C_{12a}$ and $C_{12b}$; current directing diodes D22–D42; inductor $L_{22}$; filter capacitor $C_{22}$; filter inductor $L_{32}$ and battery B2 (and/or another voltage-regulating load device, not shown). Ground nodes NG2 of second power converting subsection 1272 can be isolated from or connected to ground nodes NG1 of first power converting subsection 1271. The load voltage $V_{L2}$ of second power converting subsection 1272 can be different from or the same as the load voltage $V_{L1}$ of first power converting subsection 1271. The unshown additional power converting subsections 1273, 1274, etc. can similarly have common or isolated load ground nodes NG3, NG4, etc. and similar or different load voltages, $V_{L3}$, $V_{L4}$, etc.

Key features of the embodiment 1205 shown in FIG. 12B include the sharing of the often-bulky first inductor $L_1$ by plural power converting subsections, 1271, 1272, etc.; distribution of the source power by current splitting line 1270 to the plural power converting subsections, 1271, 1272, etc.; and generation of a plurality of optionally different load voltages, $V_{L1}$, $V_{L2}$, etc.

FIG. 12C shows a further extension of the power splitting concept used in FIG. 12B. In the embodiment 1207 of FIG. 12C, an electronic rotary switch 1270' distributes second current $I_2$ on a time-multiplexed basis to respective ones of plural power converting subsections, 1271', 1272', etc. in accordance with power distribution commands sent from a power distribution control unit 1278. It is understood that the switching rate of rotary switch 1270' is slower than that of first switch $SW_1$ and that rotary switch 1270' preferably switches while first switch $SW_1$ is closed. The power distribution control unit 1278 can allot equal time slices to each of the plural power converting subsections, 1271', 1272', etc. or it can allot time slices on an arbitrated basis in response to power request signals 1279 supplied from the various loads. The power request signals 1279 can be supplied such that they result in the production of optionally different load voltages, $V_{L1}$, $V_{L2}$, etc. at the loads (not shown) or optionally different currents $I_{L1}$, $I_{L2}$, etc. flowing through the loads (not shown).

The embodiments 1200, 1205 and 1207 of FIGS. 12A–12C can also be viewed as a counterparts to the voltage splitting scheme represented by capacitors $C_A$ and $C_B$ of FIG. 2. In cases where the source current $I_{IN}$ exceeds the level of load current $I_L$ desired at a given load or in cases where the source current $I_{IN}$ is converted into an intermediate current $I_2$ (FIGS. 12B and 12C) that exceeds the level of load current $I_L$ desired at a given load, the intermediate current $I_2$ is split (by current splitting line 1270 or rotary switch 1270') into subcurrents $I_{21}$, $I_{22}$, etc. in an essentially lossless manner. A subcurrent $I_{21}$, $I_{22}$, etc. that matches the needs of its respective load is transferred to that load by the corresponding power converting subsection, 1271, 1272, etc. The subcurrent $I_{21}$, $I_{22}$, etc. that is diverted away from a given load represents excess current. The energy of the excess current is stored in an electrostatic or electrochemical storage means (e.g., $C_{22}$ and/or B2 for the case where B1 is the given load). While not shown, the stored excess energy can then be recycled in an essentially lossless manner back to a given load at an appropriate time. One way of creating such an energy recycling system is to use the outputs (B1, B2, etc.) of embodiments 1205, 1207 (FIGS. 12B, 12C) as the voltage source inputs 1121, 1122, etc., of embodiment 1205 (FIG. 11B).

Yet another aspect of the invention that can be seen by using the outputs (B1, B2, etc.) of embodiments 1205, 1207 (FIGS. 12B, 12C) as the voltage source inputs 1121, 1122, etc., of embodiment 1205 (FIG. 11B) is that excess power flow is spatially and/or temporally diverted away from its intended load in an essentially lossless manner, the energy of the diverted-away power flow is stored in an essentially lossless manner in the form of one or more of: (a) electromagnetic energy (in the inductors); (b) electrostatic energy (in the capacitors); and electrochemical energy (in the batteries). The stored excess energy is thereafter recycled by converting it into a power form that is acceptable by the load and directing the acceptable power form to the load.

Figure 13:
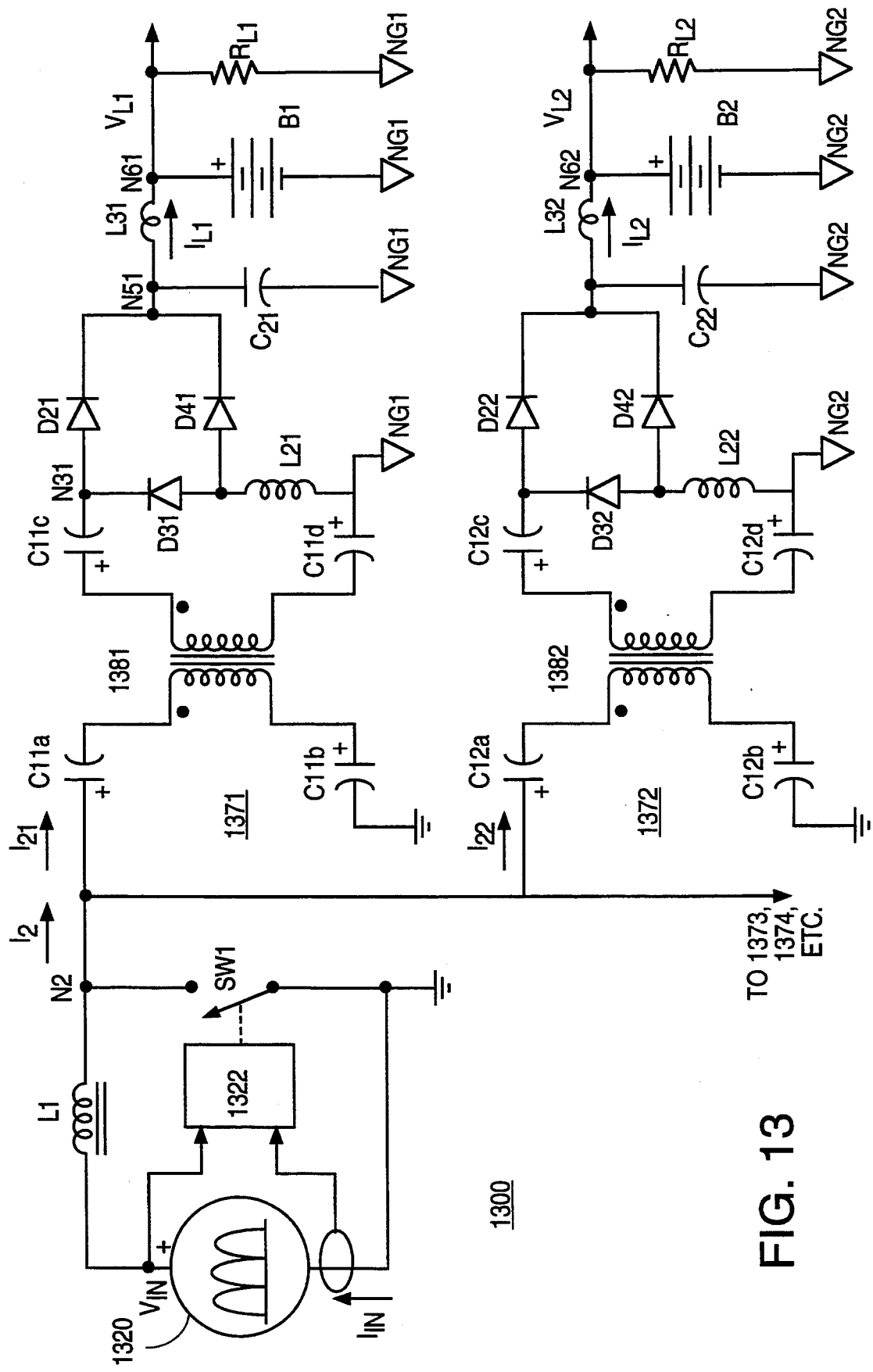
FIG. 13 shows a source power splitting embodiment of the invention with input/output isolation.

FIG. 13 shows yet a further extension of the power splitting concept used in FIG. 12B. Like reference symbols and numbers in the "1300" series are utilized where practical in FIG. 13 for elements which have like-numbered counterparts numbered in the 1200 series in FIG. 12B. A detailed description is therefore not necessary. In FIG. 13, an isolation transformer 1381 and capacitors $C_{11c}$ and $C_{11d}$ are interposed as shown after capacitors $C_{11a}$ and $C_{11b}$ of first power converting subsection 1371 to provide isolation between power source 1320 and load nodes N61 and NG1. Similarly, another isolation transformer 1382 and capacitors $C_{12c}$ and $C_{12d}$ are interposed after capacitors $C_{12a}$ and $C_{12b}$ of second power converting subsection 1372 to provide isolation between power source 1320 and load nodes N62 and NG2.

Many variations on theme will become apparent to those skilled in the art after studying the above disclosure. For example, in FIG. 13, the cores of transformers 1381 and 1382 can be merged into a single core and the primary of transformer 1382 can be eliminated. In such a case, power splitting will occur at the secondary side of this merged (not shown) transformer 1381/1382. The above disclosure is therefore to be taken as illustrative of the invention, not as limiting its scope or spirit.

Figure 14:
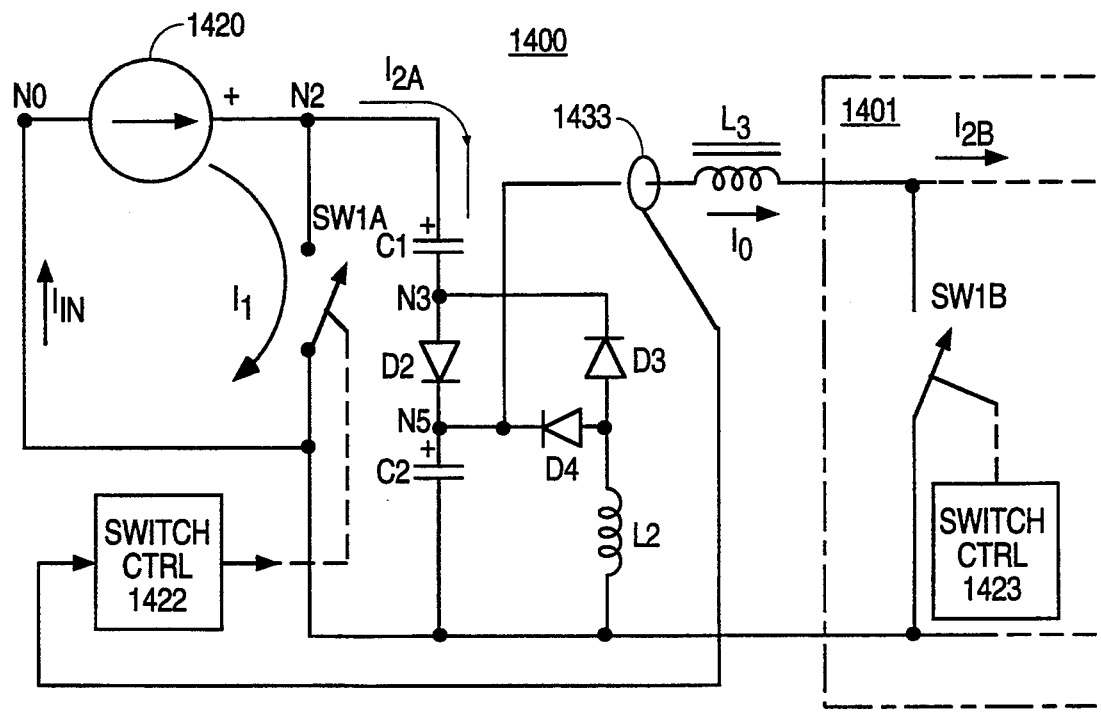
FIG. 14 shows an embodiment of the invention where the input power source is a unidirectional current source and switching controls output current rather than voltage.

Most of the above discussion has been directed at situations where the input power form has a constant or otherwise regulated voltage. The concept of the TT converter is not, however, limited to such a constraint. FIG. 14 shows an embodiment 1400 of the invention where switching controls output current rather than voltage.

In FIG. 14, power source 1420 is a unipolar current source that supplies a unidirectional input current $I_{IN}$. First switch $SW_{1A}$ selectively directs the unidirectional input current $I_{IN}$ to circulate in a first current loop as the illustrated first current $I_1$ or to flow in a second current loop as second current $I_{2A}$. Second current $I_{2A}$ flows into first capacitor $C_1$. A first switch control unit 1422 alternatingly opens and closes first switch $SW_{1A}$.

Diode D2 directs the second current $I_{2A}$ into second capacitor $C_2$. First and second capacitors, $C_1$ and $C_2$, convert second current $I_{2A}$ into a voltage $V_{N2}$ which is subdivided across capacitors $C_1$ and $C_2$ as respective voltages $V_{23}$ and $V_{N5}$. Diode D3 converts the voltage $V_{23}$ of first capacitor $C_1$ into third current $I_3$ (not shown) which then flows through second inductor $L_2$. Diode D4 directs the consequential fourth current $I_4$ (not shown) into second capacitor $C_2$. Second capacitor $C_2$ converts fourth current $I_4$ into a voltage ($V_{N5}$). The combination of third inductor $L_3$ and a further switch, $SW_{1B}$, convert the voltage ($V_{N5}$) across second capacitor $C_2$ into an output current $I_O$. Output current $I_O$ can then be considered the input current for a next converter section 1401, where further switch $SW_{1B}$ and its corresponding second switch control unit 1423 can define the front end of the next converter section 1401.

In one embodiment, a current sensor 1433 is provided to monitor the magnitude of output current $I_O$. First switch control unit 1422 then adjusts the timings of the alternating opened and closed states of first switch $SW_{1A}$ to provide a desired magnitude or envelope for output current $I_O$.

For purposes of providing a continuous flow of output current $I_O$, the converter 1400 of FIG. 14 is preferably operated in the continuous conduction mode. (Fourth current $I_4$ is not allowed to decay to zero during steady state operations.) In continuous conduction mode, the average output current $I_O$ is equal to the average value of third current $I_3$ (not shown). The average value of third current $I_3$ in turn, is defined by the following Eq. 3.2:

$$I_{3average} = \frac{(1 - D) \cdot I_{INaverage}}{D} \qquad \{Eq.\ 3.2\}$$

where D is the duty cycle of the ON states (conductive states) of first switch $SW_{1A}$ and $I_{INaverage}$ is the average value over time of input current $I_{IN}$. It is therefore possible to set the average output current $I_O$ equal to a desired ratio of source current $I_{IN}$ by selecting an appropriate duty cycle D. The conversion from current to voltage, to current, etc. can be carried out over as many stages as desired. It is understood that $L_2$ and $L_3$ will generally have relatively large values of inductance for sustaining a desired flow of their respective currents, $I_4$ and $I_O$.

Figure 15:
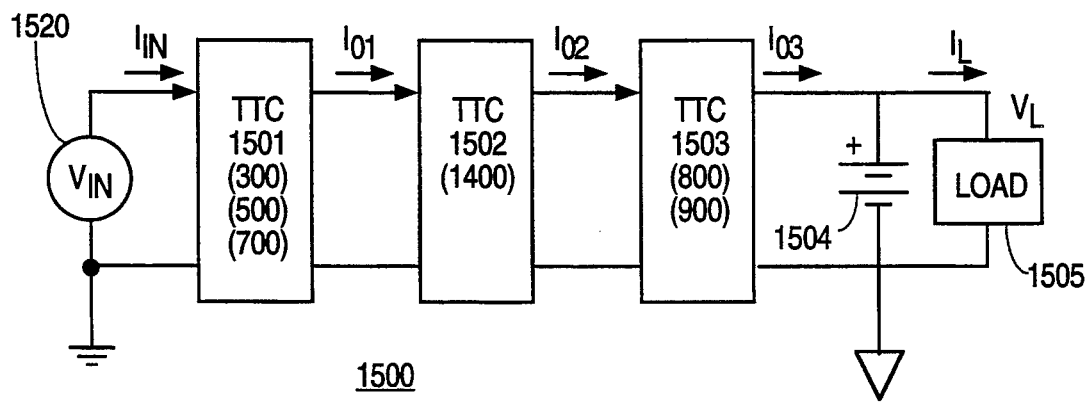
FIG. 15 is a block diagram of a series of TT converter circuits provided for converting an input power form into a load power form having desired voltage and/or current parameters.

FIG. 15 shows a further embodiment 1500 in which a first TT converter circuit 1501 (of a design chosen from or similar to that of previously described TT converter circuits 300, 500, 700, 800, 900, 1000, 1100, and 1105) converts an input voltage $V_{IN}$ of a primary power source 1520 into a first output current $I_{O1}$. A second TT converter circuit 1502 (of a structure similar to that of current converter 1400) converts first current $I_{O1}$ into another output current $I_{O2}$. A third TT converter circuit 1503 (of a design chosen from or similar to that of previously described TT converter circuits 300, 800, 900, and 1000) converts second output current $I_{O2}$ into a third output current $I_{O3}$ and an output voltage $V_L$ which is applied across load 1505. Chargeable battery 1504 is optionally provided in parallel with load 1505 for regulating the output voltage $V_L$, for absorbing excess power which load 1505 is unable to absorb at any given time and for providing back up power in the event of a failure at the primary power source 1520. The average value of third output current $I_{O3}$ is preferably set slightly above the level $I_L$ requested by load 1505 in order to continuously charge the battery 1504 and/or maintain a reserve charge across the excess voltage ($V_{23}$) absorbing capacitor ($C_1$, not shown) of third TT converter circuit 1503.

In summation, a power transfer method and apparatus for efficient transfer of power are disclosed herein. Input power is converted in an essentially lossless manner to an intermediate form having a voltage or current in excess of that desired at the load. The intermediate power form is split in an essentially lossless manner into first and second parts, where the first part of the intermediate power form approximately matches an output power form desired at an output of the power transfer apparatus and the second part represents an excess power form. The first part of the intermediate power form is transferred to the output of the power transfer apparatus and the excess part is stored. Part or all of the stored excess energy is recycled in an essentially lossless manner, converted into a form that approximately matches the output power form desired at the output of the power transfer apparatus and transferred to the output of the power transfer apparatus.

Another way of viewing this concept is from the point of view of charge transfer per cycle of a cyclical power transfer system. A power source supplies a first quantum of charge per cycle (in time periods T1 and T3 of FIG. 4), where the first quantum of charge per cycle ($QC_1$/cycle) exceeds a second quantum of charge per cycle ($QC_2$/cycle) that is absorbed by a load. In accordance with the invention, for each cycle of the power transfer system, the source quantum of charge ($QC_1$) (which is equal to the over-time integrals of the I1 ramps shown in FIG. 4) is subdivided in an essentially lossless manner into first and second parts, where the first part of the subdivided source quantum of charge ($QC_{1A}$) approximately matches the second quantum of charge ($QC_2$) that is to be absorbed by the load and the second part of the subdivided source quantum of charge ($QC_{1B}$) represents excess charge on a per cycle basis. The excess charge is stored in an excess charge storage means (e.g., capacitor $C_B$ of FIG. 2 or first capacitor $C_1$ of FIG. 3). Part or all of the stored excess charge is recycled in an essentially lossless manner in a subsequent cycle of the cyclical power system, converted into a form that approximately matches a power form desired at the load and transferred as such to the load. During the same subsequent cycle, a new amount of excess charge may develop. This excess charge is stored and saved for recycling within the next transfer cycle. In this way, excess charge supplied by the power source is saved and efficiently transferred to the load.

Several advantages are obtained from converting an input power form into an intermediate and excessive power form and thereafter splitting the intermediate power form into one part that matches an output requirement and a second part which represents the excess. First, the voltage and/or current parameters of the input power source do not need to, of their own accord, match or exceed the requirements of the output. In other words, a low-voltage power source can be used to supply power to a load requiring a higher voltage. Second, because the power source parameters are in essence disassociated from the output voltage and current parameters, a front-end power factor or impedance matching function can be provided to match a power factor or impedance requirement of the input power source. Third, the output voltage and current parameters can be varied as desired. In other words, a same power transfer apparatus can be used to supply power to either a load requiring a relatively low voltage or a load requiring a substantially higher voltage. Fourth, a relatively high energy transfer efficiency can be obtained because power form splitting occurs in an essentially lossless manner and excess power recycling also occurs in an essentially lossless manner.

The above term, "essentially lossless," is understood to cover parasitic losses encountered in the switches and various other components of the TT converter circuits. Commercial grade capacitors and batteries are understood to constitute examples of means for converting a given current in an essentially lossless manner into electrostatically or electrochemically stored energy. Commercial grade inductors are understood to constitute examples of means for converting voltage in an essentially lossless manner into electromagnetically stored energy.

Numerous other modifications and variations will become apparent to those skilled in the art after studying the above disclosure. Given the nature of the above disclosure of general concepts and specific embodiments, it is to be understood that the scope of protection sought here is to be defined by the claims appended hereto.

What is claimed is:

1. A power transfer system for transferring power from a power source having predefined voltage parameters or predefined current parameters to a load across which it is desirable to develop a predefined load voltage or through which it is desirable to develop a predefined load current, said power transfer system comprising:

input power-form converting means for receiving input power from the power source and for converting the received input power into an intermediate power form having an intermediate voltage and an intermediate current, where at least one of the intermediate voltage and the intermediate current exceeds a corresponding one of the predefined load voltage and predefined load current that are to be desirably produced at the load;

intermediate power-form splitting means, coupled to the input power-form converting means, for splitting at least one of the intermediate voltage and the intermediate current in an essentially lossless manner into a first split part and a second split part, where the first split part substantially matches at least a corresponding one of the predefined load voltage and predefined load current that are to be desirably produced at the load and the second split part represents excess energy;

transfer means, coupled to the intermediate power-form splitting means, for transferring the first split part to the load; and excess power storage means, coupled to the input power-form converting means, for storing the excess-representing second split part.

2. The power transfer system of claim 1 further comprising:

excess energy recycling means, coupled to the excess power storage means, for converting part or all of the second split part into a recycled power form and for directing the recycled power form to the load.

3. The power transfer system of claim 2 wherein the excess-representing, second split part includes an excess voltage and the excess energy recycling means includes:

voltage-to-current converting means for converting part or all of the excess voltage into an excess-representing current; and current directing means, coupled to the voltage-to-current converting means, for directing the excess-representing current to the load.

4. The power transfer system of claim 1 wherein the power source includes an AC power source that supplies an alternating current form of power having a power factor and the input power-form converting means includes:

rectifier means, coupled to the AC power source, for converting the alternating current form to a unipolar power form;

intermediate current range defining means, coupled to the rectifier means, for drawing a first current from the rectifier means and for defining a steady-state range of magnitudes for the drawn first current, where the drawn first current determines the magnitude of AC current drawn from the AC power source; and power-factor correcting means, responsive to the voltage and current of the AC power source and operatively coupled to control the intermediate current range defining means, for urging the current portion of the unipolar power form to have a magnitude or envelope that substantially tracks the voltage portion of the unipolar power form.

5. The power transfer system of claim 1 further comprising:

isolation means, interposed between the power source and the load, for providing DC or low frequency isolation between the power source and the load.

6. The power transfer system of claim 5 wherein the isolation means includes one or more DC blocking capacitors interposed between the power source and the load.

7. The power transfer system of claim 5 wherein the isolation means includes an isolation transformer interposed between the power source and the load for providing DC isolation between the power source and the load.

8. A power transfer system for transferring power from a power source having predefined voltage parameters or predefined current parameters to a load across which it is desirable to develop a predefined load voltage or through which it is desirable to develop a predefined load current, said power transfer system comprising:

power input means for receiving input power of a form having a unipolar input voltage and a unidirectional input current;

first current switching means, coupled to the power input means, for selectively directing the unidirectional input current into a first current loop that carries a first current or into a second current loop that carries a second current;

first power-form converting means, coupled to the first current switching means, for receiving the second current of the second current loop, for converting the second current into an intermediate voltage in an essentially lossless manner, and for splitting the intermediate voltage in an essentially lossless manner into a first part voltage and a second part voltage; and second power-form converting means, coupled to the first power-form converting means, for converting part or all of the second part voltage into a power recycling current and for directing the power recycling current to the load.

9. The power transfer system of claim 8 wherein said first power-form converting means includes first storage means for storing the second part voltage.

10. The power transfer system of claim 8 wherein said first power-form convercing means includes second storage means for storing the first part voltage.

11. A power transfer system for transferring power to a load having a load voltage thereacross, said power transfer system comprising:

power input means for receiving input power of a form having a unipolar voltage;

voltage converting means for converting the input unipolar voltage into an intermediate voltage in an essentially lossless manner, where the intermediate voltage is greater than the load voltage; and voltage splitting and storing means for splitting the intermediate voltage in an essentially lossless manner into a first part voltage matching the load voltage and a second part voltage representing a difference between the intermediate voltage and the load voltage, and for storing the second part voltage.

12. A power transfer system according to claim 11 further comprising:

excess power recycling means for converting part or all of the stored second part voltage into a power recycling current and for directing the power recycling current to the load.

13. A power transfer system according to claim 12 wherein the load includes self-regulating means for maintaining the load voltage at a predefined level.

14. A power transfer system according to claim 13 wherein the self-regulating means includes a battery.

15. A power transfer system according to claim 14 wherein the battery of the self-regulating means is a chargeable battery.

16. A power transfer system comprising:

a set of first through sixth circuit nodes, where the second and first nodes are adapted to receive a unipolar input voltage thereacross and the sixth and first nodes are adapted to output a load current to a load;

a first inductor having ends coupled respectively to the second and third nodes;

a first capacitor having ends coupled respectively to the third and fourth nodes;

a second inductor;

a controllable switch having ends coupled respectively to the first and third nodes;

a first unidirectional current directing means coupled to the first capacitor for directing current from the first capacitor by way of the fourth node unidirectionally into the sixth node;

a second unidirectional current directing means coupled in series with said second inductor, the series combination formed by the second inductor and the second unidirectional current directing means including said fifth node, said series combination being coupled between the first and fourth nodes for directing current unidirectionally from the first node through the second inductor to the fourth node; and a switch control unit operatively coupled to the controllable switch for alternatingly opening and closing the controllable switch.

17. A power transfer system according to claim 16 wherein:

the second inductor has a first end connected to the fourth node and a second end connected to the fifth node; and the second unidirectional current directing means has a first end connected to the fifth node and a second end connected to the first node.

18. A power transfer system according to claim 16 further comprising charge storage means connected to the first and sixth nodes for storing charge.

19. A power transfer system according to claim 18 wherein said charge storage means includes a chargeable battery.

20. A power transfer system according to claim 16 wherein said unipolar input voltage is pulsed.

21. A power transfer method for transferring power from a power source having given voltage parameters or given current parameters to an output port across which it is desirable to develop a predefined output voltage or through which it is desirable to develop a predefined output current, said power transfer method comprising the steps of:

developing or obtaining an intermediate power form having an intermediate voltage and an intermediate current, where at least one of the intermediate voltage and the intermediate current exceeds a corresponding one of the predefined output voltage and predefined output current that are to be desirably produced at the output port;

splitting at least one of the intermediate voltage and the intermediate current in an essentially lossless manner into a first split part and a second split part, where the first split part substantially matches at least a corresponding one of the predefined load voltage and predefined 10ad current that are to be desirably produced at the output port and the second split part represents excess energy;

transferring the first split part to the output port; and storing the excess-representing second split part.

22. A power transfer method according to claim 21 further comprising the step of limiting the magnitude of at least one of the intermediate voltage and the intermediate current to a predefined maximum value.

23. An interconnected plurality of power transfer systems where each power transfer system comprises:

input current receiving means for receiving input current surges representing surges of input power;

form converting and splitting means, operatively coupled to the input current receiving means, for converting the received input current surges into a split voltage, the split voltage having a first part representing excess power and a second part representing a portion of one or more of the received surges of input power that is to be output from the power transfer system, where the form converting and splitting means includes excess power storage means for storing the first part of the split voltage; and power output means, operatively coupled to the form converting and splitting means, for outputting power derived from said second part of the split voltage out of the power transfer system.

24. An interconnected plurality of power transfer systems according to claim 23 where the power output means of a first of said plurality of power transfer systems is operatively coupled to the input current receiving means of a second of said plurality of power transfer systems for transferring power from the first power transfer system to the second power transfer system.

25. An interconnected plurality of power transfer systems according to claim 23 where the power output means of a first of said plurality of power transfer systems is operatively coupled to the power output means of a second of said plurality of power transfer systems for merging the power output of the first power transfer system with the power output of the second power transfer system.

26. An interconnected plurality of power transfer systems according to claim 23 where the input current receiving means of a first of said plurality of power transfer systems operatively coupled to the input current receiving means of a second of said plurality of power transfer systems for splitting input power between the first power transfer system and the second power transfer system.

27. An interconnected plurality of power transfer systems according to claim 26 further comprising:

a shared current surge generating means, operatively coupled to the input current receiving means of the first and second power transfer systems, for supplying said input current surges either in parallel or multiplexed over time to the first and second power transfer systems.

28. An interconnected plurality of power transfer systems according to claim 27 where the shared current surge generating means comprises:

a shared inductor; and a shared switching means for alternatingly applying a unipolar voltage across the shared inductor to develop a magnetic field-replenishing current in the shared inductor and for directing field-depleting surges of current from the shared inductor to the first and second power transfer systems.

29. An interconnected plurality of power transfer systems according to claim 23 further comprising:

current distributing means, operatively coupled to the input current receiving means of at least a first of said plurality of power transfer systems and of at least second of said plurality of power transfer systems, for splitting input power on a time-multiplexed basis between the first power transfer system and the second power transfer system.

30. A multi-input power transfer system for transferring power to a load from a plurality of unipolar voltage sources, the multi-input power transfer system comprising:

input current receiving means for receiving input current surges representing surges of input power;

form converting and splitting means, operatively coupled to the input current receiving means, for converting the received input current surges into a split voltage, the split voltage having a first part representing excess power and a second part representing a portion of one or more of the received surges of input power that is to be output from the power transfer system, where the form converting and splitting means includes excess power storage means for storing the first part of the split voltage;

power output means, operatively coupled to the form converting and splitting means, for outputting power derived from said second part of the split voltage out of the power transfer system; and a current surge generating means, operatively coupled to receive power from the plurality of unipolar voltage sources and operatively coupled to the input current receiving means, for converting the voltage of at least one of said unipolar voltage sources into the input current surges and for supplying said input current surges to the input current receiving means.

31. A multi-input power transfer system according to claim 30 wherein the current surge generating means comprises:

a plurality of inductors each coupled to receive power from a corresponding one of said plurality of unipolar voltage sources;

a plurality of current directing means, operatively coupled to respective ones of the inductors, for directing current flow from the respective inductors to the input current receiving means; and switching means, operatively coupled to the plurality of inductors, for alternatingly applying a unipolar voltage of at least one of said unipolar voltage sources across a respective one of said inductors to develop a magnetic field-replenishing current in the respective one inductor and for directing field-depleting surges of current from the respective one inductor to the input current receiving means.

32. A cyclical power transfer system for transferring power over successive cycles from a power source to a load, the cyclical power transfer system comprising:

power receiving means for receiving in alternating ones of the cycles first quantums of charge per cycle from the power source, where one or more of the first quantums of charge per cycle exceeds a second quantum of charge per cycle that is to be absorbed by the load;

charge splitting and storing means, operatively coupled to the power source, for subdividing the quantum of charge supplied by the power source during each of said alternating ones of the cycles in an essentially lossless manner into first and second parts, where the first part of the subdivided source quantum of charge approximately matches the second quantum of charge that is to be absorbed by the load and the second part of the subdivided source quantum of charge represents excess charge on a per cycle basis, and for storing the excess-representing second part of the subdivided source quantum of charge; and excess charge recycling means, operatively coupled to the charge splitting and storing means, for recycling part or all of the stored excess charge in an essentially lossless manner in other ones of said cycles to the load, said recycling including converting the recycled excess charge into a form that approximately matches a power form desired at the load.

33. A current drawing method for drawing current from a unipolar power source having a given voltage waveform and causing the drawn current to have a waveform which has a prescribed relation to the waveform of the given voltage; said method being for supplying power to a load at which it is desirable to develop a load voltage or load current different from the that of the unipolar power source, said method comprising the steps of:

alternatingly applying the given voltage across a first inductor so as to establish a first current flowing through the first inductor and removing a second current from the first inductor such that the magnitude of the drawn current is alternatingly defined by the values for the first and second currents; and controlling the timings of said alternating application of the given voltage and removal of the second current independently of the establishment at the load of said load voltage or load current so as to establish a range of minimum and maximum values for the first and second currents thereby causing the drawn current to have a waveform which has a prescribed relation to the waveform of the given voltage.

34. A current drawing method for drawing current from a unipolar power source having a given voltage waveform and for causing the drawn current to have a waveform which has a prescribed relation to the waveform of the given voltage, said method comprising the steps of:

alternatingly applying the given voltage across a first inductor so as to establish a first current flowing through the first inductor and removing a second current from the first inductor such that the magnitude of the drawn current is alternatingly defined by the values for the first and second currents; and controlling the timings of said alternating application of the given voltage and removal of the second current so as to establish a range of minimum and maximum values for the first and second currents thereby causing the drawn current to have a waveform which has a prescribed relation to the waveform of the given voltage;

wherein said step of controlling the timings of said alternating application of the given voltage and removal of the second current produces an intermediate voltage and an intermediate current;

wherein at least one of the intermediate voltage and the intermediate current exceeds a corresponding one of a predefined output voltage and predefined output current that are to be desirably produced at an output port; and wherein said method further comprises the steps of:

splitting at least one of the intermediate voltage and the intermediate current in an essentially lossless manner into a first split part and a second split part, where the first split part substantially matches at least a corresponding one of the predefined load voltage and predefined load current that are to be desirably produced at the output port and the second split part represents excess energy; and storing the excess-representing second split part.

35. A current drawing method according to claim 33 wherein said unipolar power source is driven by an alternating current power source and the step of controlling the timings of said alternating application of the given voltage and removal of the second current maintains at least a prescribed minimum power factor for the power delivered from the alternating current power source to the unipolar power source.

36. A power factor correcting and power transfer system for transferring power from a power source having a source voltage and a source current, wherein one of the source voltage and source current has a predefined magnitude versus time waveform, to a load at which it is desirable to develop a different load voltage or load current, where an over-time relationship between the source voltage and source current defines a source power factor and an amount of power drawn per unit of time from the power source, said power factor correcting and power transfer system comprising:

current drawing means, operatively coupled to the power source, for drawing first and second currents from the power source, where the first and second currents flow alternatingly in successive and respective time periods, the first current increases in magnitude during its respective time periods, the second current decreases in magnitude over its corresponding time periods, and the magnitude of the first current at the end of its respective time periods defines the magnitude of the second current at the beginning of its corresponding time periods;

control means, operatively coupled to the current drawing means, for controlling the magnitudes of the first and second currents drawn from the power source such that an envelope defined by at least peak values of the first and second currents substantially tracks the source voltage oven time; and power transfer means, operatively coupled to the current drawing means, for transferring part or essentially all of the power drawn per unit of time from the power source to the load, said power transfer means including output parameter defining means for defining independently of the control means the different load voltage or load current.

37. A power factor correcting and power transfer system according to claim 36 wherein the envelope that substantially tracks the source voltage is defined by peak and minimum values of the first and second currents.

38. A power factor correcting and power transfer system according to claim 36 wherein minimum values of the first and second currents are at or substantially close to zero.

39. A power factor correcting and power transfer system according to claim 36 wherein the output parameter defining means includes:

excess power storage means, operatively coupled to the current drawing means, for storing excess power defined by a difference between the power drawn per unit of time from the power source and power absorbed per unit of time by the load.

40. A power factor correcting and power transfer system according to claim 39 further comprising:

excess power recycling means, operatively coupled to the excess power storage means and the load, for transferring pre-stored excess power to the load.

41. A power factor correcting and power transfer system according to claim 36 wherein an envelope defined by minimum values of the first and second currents does not substantially track the source voltage over time.

* * * * *